US011966218B2

(12) United States Patent
Masuzaki et al.

(10) Patent No.: US 11,966,218 B2
(45) Date of Patent: Apr. 23, 2024

(54) DIAGNOSIS DEVICE, DIAGNOSIS METHOD AND PROGRAM

(71) Applicant: Mitsubishi Electric Corporation, Tokyo (JP)

(72) Inventors: Takahiko Masuzaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 645 days.

(21) Appl. No.: 16/973,770

(22) PCT Filed: Jun. 15, 2018

(86) PCT No.: PCT/JP2018/023044
§ 371 (c)(1),
(2) Date: Dec. 10, 2020

(87) PCT Pub. No.: WO2019/239607
PCT Pub. Date: Dec. 19, 2019

(65) Prior Publication Data
US 2021/0247751 A1    Aug. 12, 2021

(51) Int. Cl.
*G05B 23/02* (2006.01)
*G06F 18/2113* (2023.01)
(Continued)

(52) U.S. Cl.
CPC ........ *G05B 23/024* (2013.01); *G06F 18/2113* (2023.01); *G06F 18/22* (2023.01); *G06F 18/2413* (2023.01)

(58) Field of Classification Search
CPC .............. G05B 23/024; G05B 23/0235; G06F 18/2113; G06F 18/22; G06F 18/2413; G06F 18/23213
See application file for complete search history.

(56) References Cited

U.S. PATENT DOCUMENTS

2017/0097863 A1\* 4/2017 Ishii .................... G06F 11/0778
2017/0097980 A1   4/2017 Ishii et al.
(Continued)

FOREIGN PATENT DOCUMENTS

CN      107102619 A     8/2017
JP      2008-262375 A   10/2008
(Continued)

OTHER PUBLICATIONS

International Search Report and Written Opinion dated Aug. 28, 2018, received for PCT Application No. PCT/JP2018/023044, Filed on Jun. 15, 2018, 8 pages including English Translation.
(Continued)

Primary Examiner — Mohammad K Islam
(74) Attorney, Agent, or Firm — XSENSUS LLP

(57) ABSTRACT

A diagnosis device (10) includes an acquirer (101) and a diagnoser (140). The acquirer (101) acquires a series of input values as an input signal to be diagnosed as to presence or absence of abnormality. The diagnoser (140) diagnoses the presence or absence of the abnormality from (i) a first index value indicating a distance between an input vector and a predetermined first reference vector, the input vector having components that are the input values of the series acquired by the acquirer (101), and (ii) a second index value indicating an angle between the input vector and a predetermined second reference vector.

15 Claims, 24 Drawing Sheets

(51) Int. Cl.
    *G06F 18/22*     (2023.01)
    *G06F 18/2413*     (2023.01)

(56) References Cited

U.S. PATENT DOCUMENTS

| | | |
|---|---|---|
| 2017/0243135 A1 | 8/2017 | Ooba et al. |
| 2018/0095454 A1* | 4/2018 | Zhao ................ G06F 17/18 |
| 2018/0239345 A1* | 8/2018 | Noda ................ G05B 23/02 |
| 2019/0057504 A1* | 2/2019 | Kobayashi .......... G06F 18/2415 |

FOREIGN PATENT DOCUMENTS

| | | |
|---|---|---|
| JP | 2013-175108 A | 9/2013 |
| JP | 2014-149840 A | 8/2014 |
| JP | 2015-088078 A | 5/2015 |
| JP | 2017-057712 A | 3/2017 |
| JP | 2017-068748 A | 4/2017 |
| JP | 2017-194341 A | 10/2017 |
| JP | 2017-220176 A | 12/2017 |

OTHER PUBLICATIONS

Notice of Reasons for Refusal dated Jun. 9, 2020, received for JP Application No. 2019-520751, 8 pages Including English Translation.

Office Action dated Dec. 6, 2023, in the corresponding Chinese Application No. 201880094543.0, 14 pages.

* cited by examiner

DIAGNOSIS DEVICE, DIAGNOSIS METHOD AND PROGRAM

CROSS-REFERENCE TO RELATED APPLICATION

The present application is based on PCT filing PCT/JP2018/023044, filed Jun. 15, 2018, the entire contents of which are incorporated herein by reference.

TECHNICAL FIELD

The present disclosure relates to a diagnosis device, a diagnosis method and a program.

BACKGROUND ART

Various types of processing systems are known, such as production systems and control systems in factories, that use time-series data indicating sensing results sensed by a sensor. In such types of processing systems, diagnosis of presence or absence of abnormality is widely performed using time-series data.

Specifically, there is a technique for diagnosing an abnormality by determining whether a signal waveform of an object to be monitored is similar to a waveform to be input in a normal state (for example, refer to Patent Literature 1). Patent Literature 1 discloses a technique for calculating an abnormality measure based on a distance between an input vector that is current time-series data and an input vector that is past time-series data stored in a database.

CITATION LIST

Patent Literature

Patent Literature 1: Unexamined Japanese Patent Application Publication No. 2014-149840

SUMMARY OF INVENTION

Technical Problem

However, as in Patent Literature 1, cases exist in which the distance between vectors is inappropriate as a criterion for determining whether the signal waveforms are similar. For example, in a case where the magnitude of a value can vary while maintaining a ratio of components of the input vectors, the technique disclosed in Patent Literature 1 has a risk in that the input vector may be erroneously determined to be abnormal when the magnitude of the input vector changes. For this reason, there is room for improving accuracy of diagnosis of the presence or absence of abnormality.

In order to solve the aforementioned problem, an objective of the present disclosure is to improve the accuracy of the diagnosis of the presence or absence of abnormality.

Solution to Problem

In order to achieve the aforementioned objective, a diagnosis device according to the present disclosure includes (i) an acquisition means for acquiring a series of input values as an input signal to be diagnosed as to presence or absence of abnormality, and (ii) diagnosis means for diagnosing the presence or absence of abnormality from: a first index value indicating a distance between an input vector and a predetermined first reference vector, the input vector having components that are the input values of the series acquired by the acquisition means; and a second index value indicating an angle between the input vector and a predetermined second reference vector.

Advantageous Effects of Invention

According to the present disclosure, the presence or absence of abnormality is diagnosed from the first index value indicating the distance between the input vector and the first reference vector and the second index value indicating the angle between the input vector and the second reference vector. As a result, accurate diagnosis is expected to be made based on the angle between the vectors even when diagnosis would be made erroneously due to the use of only the distance between the vectors. Accordingly, the accuracy of diagnosis of the presence or absence of abnormality can be improved.

DESCRIPTION OF EMBODIMENTS

Diagnosis systems 100 according to embodiments of the present disclosure are described below in detail with reference to the drawings.

Embodiment 1

Figure 1:
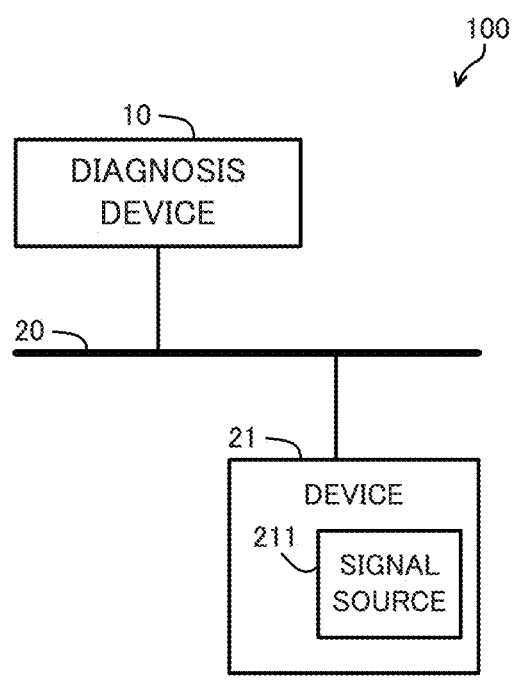
FIG. 1 is a block diagram of a configuration of a diagnosis system according to Embodiment 1 of the present disclosure.

The diagnosis system 100 according to the present embodiment corresponds to a part of a production system formed in a factory. The diagnosis system 100 collects data from the production system and diagnoses whether there is an abnormality in the production system from the collected data. Examples of the abnormality include, for example, an abnormality in which specifications of a workpiece flowing on a production line are nonstandard, a malfunction of an apparatus included in the production line, and an error that occurs during operation of the apparatus. The abnormality is a state different from a predetermined normal state that is assumed by an operator of the production system, and thus the abnormality usually causes (i) the stopping of production of products by the production system or (ii) a reduction in yield. The diagnosis system 100 supplies, to a user, information indicating a result of the diagnosis. As illustrated in FIG. 1, the diagnosis system 100 includes (i) a diagnosis device 10 that diagnoses presence or absence of abnormality, and (ii) multiple devices 21 that transmit signals to the diagnosis device 10. FIG. 1 illustrates a single device 21 as a representative device.

The diagnosis device 10 is communicatively interconnected with the devices 21 via a network 20. The network 20 is an industrial factory automation (FA) network. However, the network 20 is not limited to such a network and may be a communication network for wide-area communication or a dedicated line.

The device 21 is, for example, a sensor device, an actuator or a robot. The device 21 has a sensor as a signal source 211. By repeatedly notifying the diagnosis device 10 of a sensing result obtained by the sensor via the network 20, the device 21 transmits to the diagnosis device 10 a digital signal indicating a transition of the sensing result. The sensor is, for example, a pressure sensor, an illuminance sensor, an ultrasonic sensor, or another sensor. The signal transmitted from the device 21 is a time-series signal having a scalar value, and a sampling period of the signal is, for example, 10 milliseconds, 100 milliseconds, or one second.

However, the signal transmitted from the device 21 is not limited to such a scalar valued signal and may be a vector-valued signal. In addition, the device 21 may transmit data to the diagnosis device 10 at a period different from the sampling period of the sensor. For example, when the sampling values by the sensor are accumulated to some extent in the buffer, the device 21 may transmit, to the diagnosis device 10, data including the accumulated sampling values. The signal source 211 may be not only the sensor but also, for example, an oscillator that generates a synchronization signal for synchronizing the operation of the device 21 in the production system, or a receiver or an antenna that communicates with another remote device.

Figure 2:
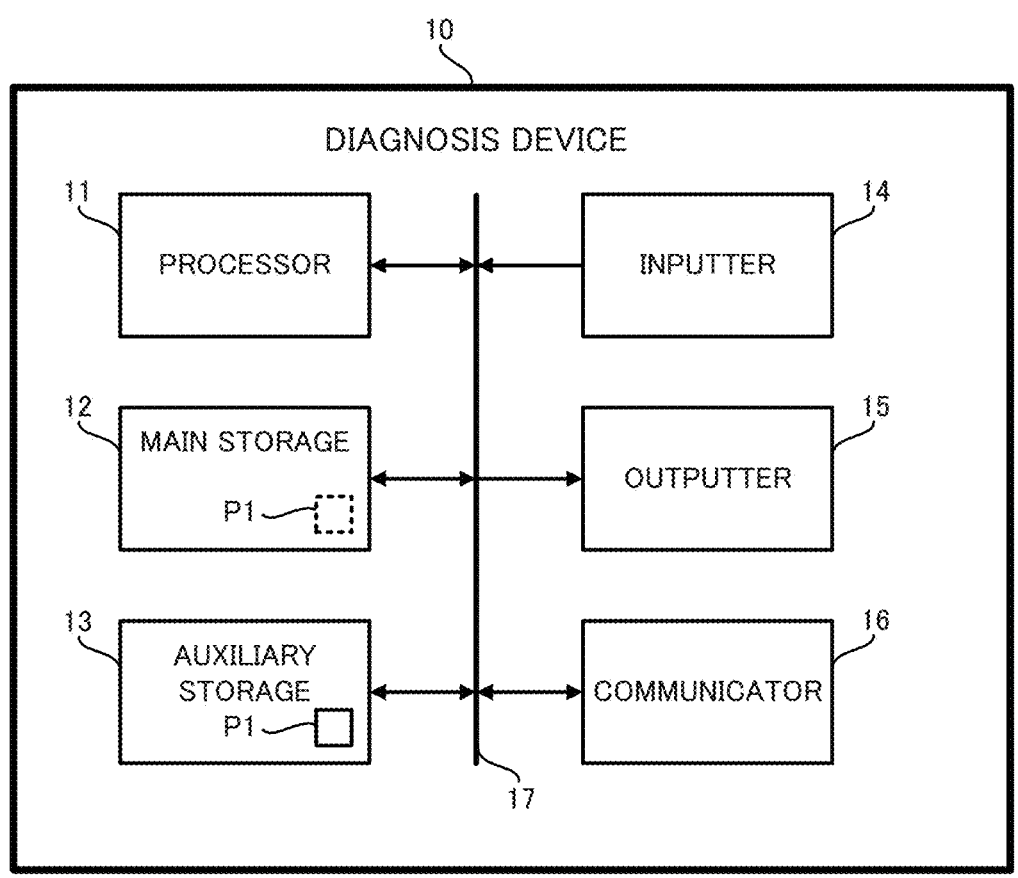
FIG. 2 is a view illustrating a configuration of hardware for a diagnosis device according to Embodiment 1.

The diagnosis device 10 is an industrial personal computer (IPC) placed in a factory. As illustrated in FIG. 2, the diagnosis device 10 includes, as a hardware configuration, a processor 11, a main storage 12, an auxiliary storage 13, an inputter 14, an outputter 15, and a communicator 16. All of the main storage 12, the auxiliary storage 13, the inputter 14, the outputter 15, and the communicator 16 are connected to the processor 11 via an internal bus 17.

The processor 11 includes a central processing unit (CPU). The processor 11 executes a program P1 stored in the auxiliary storage 13, thereby achieving various types of functions of the diagnosis device 10, thereby executing processing described later.

The main storage 12 includes a random access memory (RAM). The program P1 is loaded from the auxiliary storage 13 into the main storage 12. The main storage 12 is used as a work area for the processor 11.

The auxiliary storage 13 includes a nonvolatile memory as typified by an electrically erasable programmable read-only memory (EEPROM) and a hard disk drive (HDD). The auxiliary storage 13 stores various data used for processing of the processor 11 in addition to the program P1. In accordance with an instruction from the processor 11, the auxiliary storage 13 (i) supplies data used by the processor 11 to the processor 11 and (ii) stores data supplied from the processor 11. Although FIG. 2 only illustrates one program P1 representatively, the auxiliary storage 13 may store multiple programs, and the multiple programs may be loaded into the main storage 12.

The inputter 14 includes an input device as typified by an input key and a pointing device. The inputter 14 acquires information input by the user of the diagnosis device 10 and notifies the processor 11 of the acquired information.

The outputter 15 includes an output device as typified by a liquid crystal display (LCD) and a speaker. The outputter 15 presents various types of information to the user in accordance with instructions from the processor 11.

The communicator 16 includes a network interface circuit for communicating with an external device. The communicator 16 receives a signal from the outside and outputs data indicated by this signal to the processor 11. Also, the communicator 16 transmits, to the external device, a signal indicating data output from the processor 11.

By cooperation of the hardware configuration illustrated in FIG. 2, the diagnosis device 10 diagnoses presence or absence of abnormality and outputs information indicating a result of the diagnosis. Specifically, the diagnosis device 10 diagnoses the presence or absence of abnormality as a result of analyzing a signal by a method described later.

Figure 3:
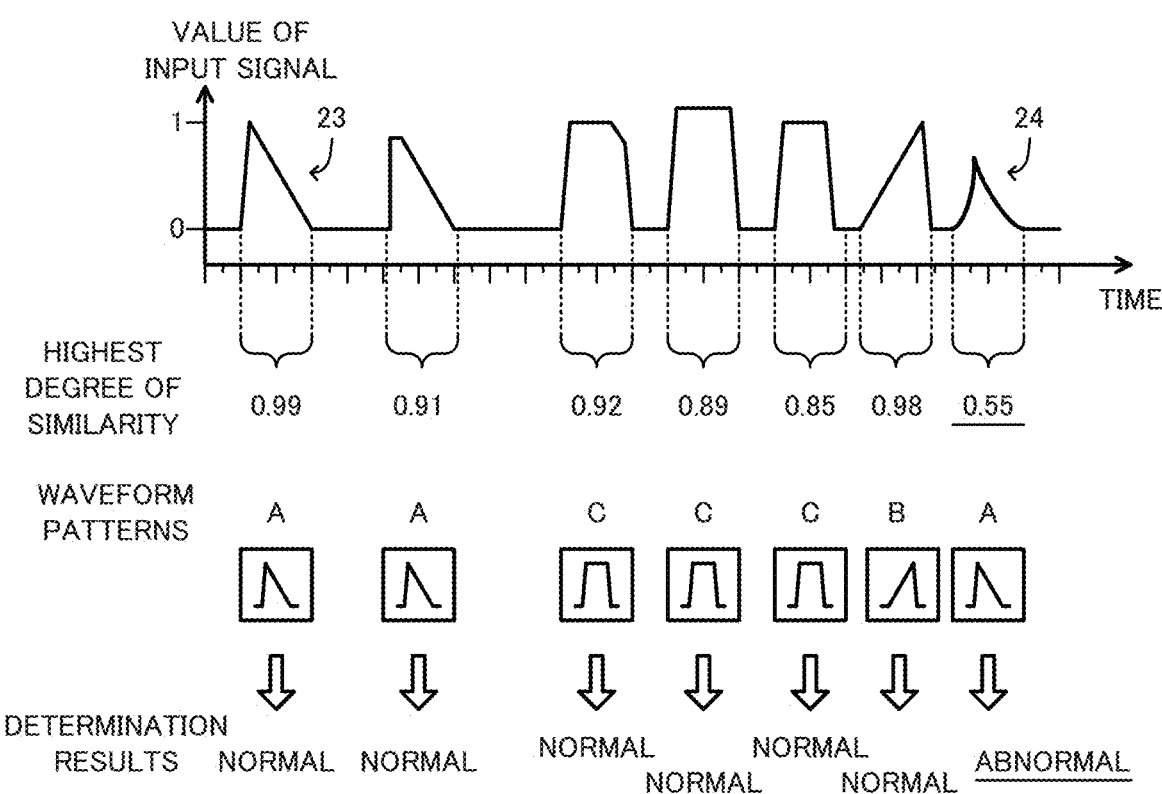
FIG. 3 is an explanatory view for illustrating a summary of abnormality diagnosis according to Embodiment 1.

In this case, a basic method of signal analysis by the diagnosis device 10 is described with reference to FIGS. 3 and 4. FIG. 3 illustrates a summary of abnormality diagnosis. An input signal input to the diagnosis device 10 is illustrated in the upper portion of FIG. 3. This input signal has a waveform similar to any one of multiple waveform patterns in the normal state. Accordingly, when the waveform of the input signal has a shape deviating from every waveform pattern, such an input signal is determined to be abnormal.

As a result of comparison with each of multiple waveform patterns A, B, and C, a first waveform 23 of the input signal in FIG. 3 indicates the highest degree of similarity of 0.99 when compared with the waveform pattern A. Since this highest degree of similarity exceeds a threshold, the waveform 23 is determined to be normal. The degree of similarity is a value ranging from zero to one and indicates a degree of similarity of waveforms with each other, and the degree of similarity is one when the waveforms match each other. A method of calculating the degree of similarity is described later. Also, the threshold is, for example, 0.8 and may be defined in advance or set by the user.

Subsequently, the waveform of the input signal is, in order, determined to be most similar to the waveform patterns A, C, C, C, B, A, and degrees of similarity to these waveform patterns are, in order, calculated as 0.91, 0.92, 0.89, 0.85, 0.98, and 0.55. Although a waveform pattern among the multiple waveform patterns A, B, and C that is most similar to the last waveform 24 is the waveform pattern A, the degree of similarity to the waveform pattern A is 0.55 and is lower than the threshold value. Accordingly, the last waveform 24 is determined to be abnormal.

Figure 4:
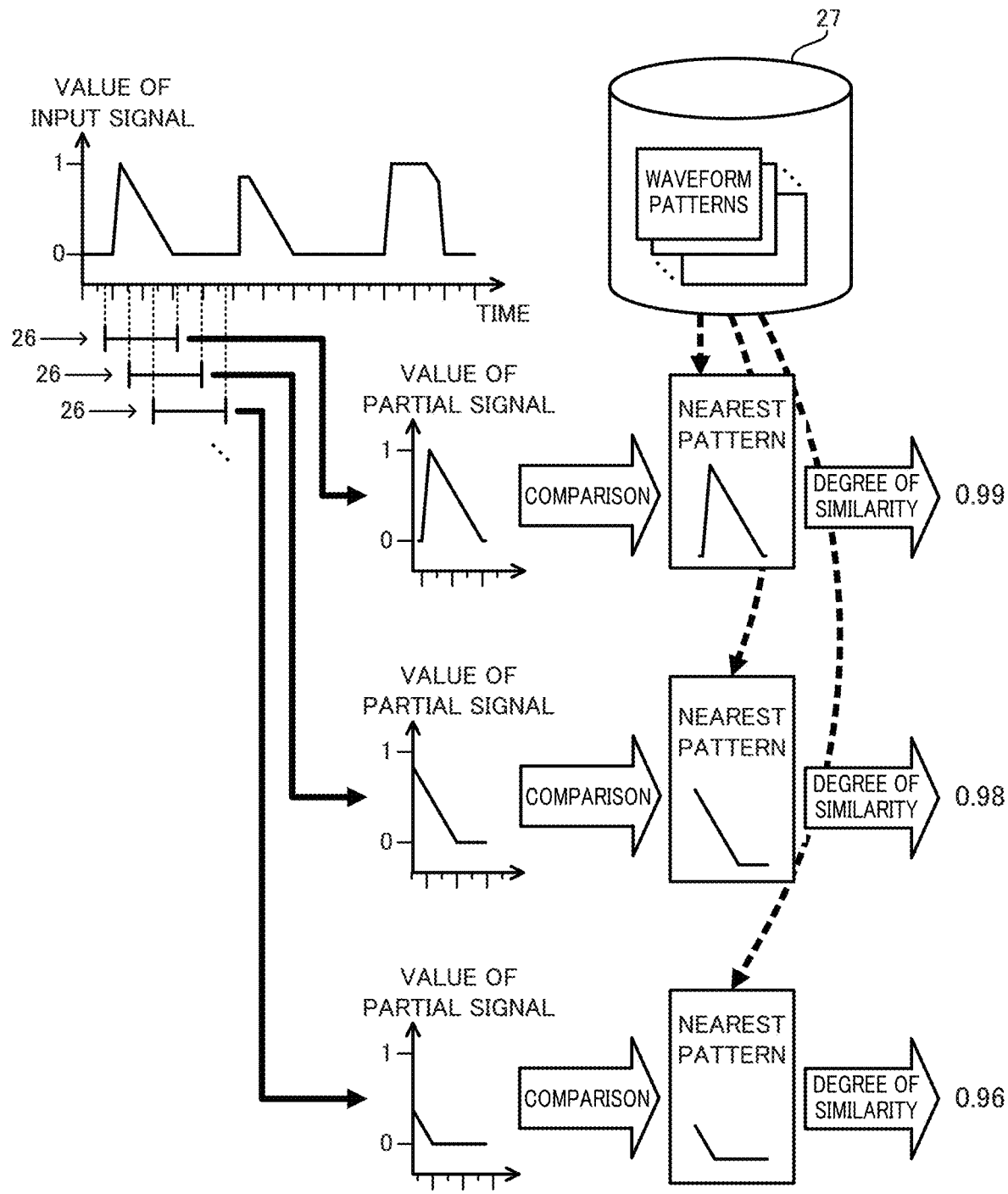
FIG. 4 is an explanatory view for illustrating segmentation of an input signal according to Embodiment 1.

FIG. 4 illustrates segmentation of the input signal for comparison of waveforms. As illustrated in FIG. 4, the diagnosis device 10 slides a window 26 having a predetermined width by a certain shift width. The window 26 is a window for cropping a portion of the input signal. For example, the window 26 corresponds to a section at which the value is one for a rectangular window function defined as having a value of one at the section and as having a value of zero outside of the section. The input signal is multiplied by this window function, thereby cutting out a portion of the input signal. Each time the window 26 is slid, the diagnosis device 10 cuts out, from the input signal, a partial signal of a section corresponding to the window 26. Next, a nearest pattern to the partial signal is extracted from the waveform patterns stored in a memory 27 in advance, and a degree of similarity as a result of comparison of the partial signal and the nearest pattern is obtained. In this case, the nearest pattern means a waveform pattern having the highest degree of similarity.

The waveform patterns are waveforms that the input signal is to have in the normal state and are stored in the memory 27 in advance. Specifically, as illustrated in FIG. 4, in order to determine whether there is an abnormality in the partial signal cut out from the input signal by a certain shift width, the diagnosis device 10 stores, as a waveform pattern in advance, a pattern obtained by shifting, in the time direction, a waveform to be input in the normal state.

The partial signal cut out from the input signal is a digital signal that is a series of the sampling values over time, and thus may also be expressed as a vector. The term, "series", means a group of values in series. Also, if the waveform patterns are expressed as a vector like the input signal, such an expression is convenient because the waveforms can be compared with one another by vector operations.

The diagnosis device 10 makes the above-described comparison between the waveforms by two methods and diagnoses the presence or absence of abnormality by combining results of the respective methods. Among these two methods, the first method is a method that focuses on a distance between the input signal and a waveform pattern, and the second method is a method that focuses on an angle between the input signal and the waveform pattern. Specifically, the first method is a method in which, by a distance between (i) an input vector that is a vector corresponding to a partial signal cut out from an input signal and (ii) a first reference vector that is a vector corresponding to a waveform pattern used in the first method, a first index value indicating a degree of similarity between these vectors is obtained. Also, the second method is a method in which, by an angle between (i) the input vector corresponding to the partial signal cut out from the input signal and (ii) a second reference vector that is a vector corresponding to a waveform pattern used in the second method, a second index value indicating a degree of similarity between these vectors is obtained.

The first reference vector and the second reference vector are vectors that indicate waveforms that the input vector is to have in the normal state, and the first reference vector and the second reference vector suitable for each of the two methods must be prepared in advance prior to diagnosis of abnormality. The diagnosis device 10 has a function for learning the first reference vector and the second reference vector. Specifically, the diagnosis device 10 has a function of learning the first reference vector and the second reference vector from a learning signal that is provided, by the user, as a signal indicating a waveform to be input in the normal state. After completion of learning, the diagnosis device 10 diagnoses, using the learned first reference vector and the learned second reference vector, the presence or absence of abnormality with respect to the input signal that is an object to be diagnosed. Hereinafter, the first reference vector and the second reference vector are collectively referred to simply as a reference vector.

Also, the first index value is a value serving as an index indicating a degree of similarity between (i) a waveform indicated by the input vector and (ii) a waveform indicated by the first reference vector, and the first index value corresponds to the degree of similarity between these waveforms. Also, the second index value is a value serving as an index indicating a degree of similarity between (i) the waveform indicated by the input vector and (ii) a waveform indicated by the second reference vector, and the second index value corresponds to a degree of similarity between these waveforms. Details of the calculation method of the first index value and the second index value are described later.

Figure 5:
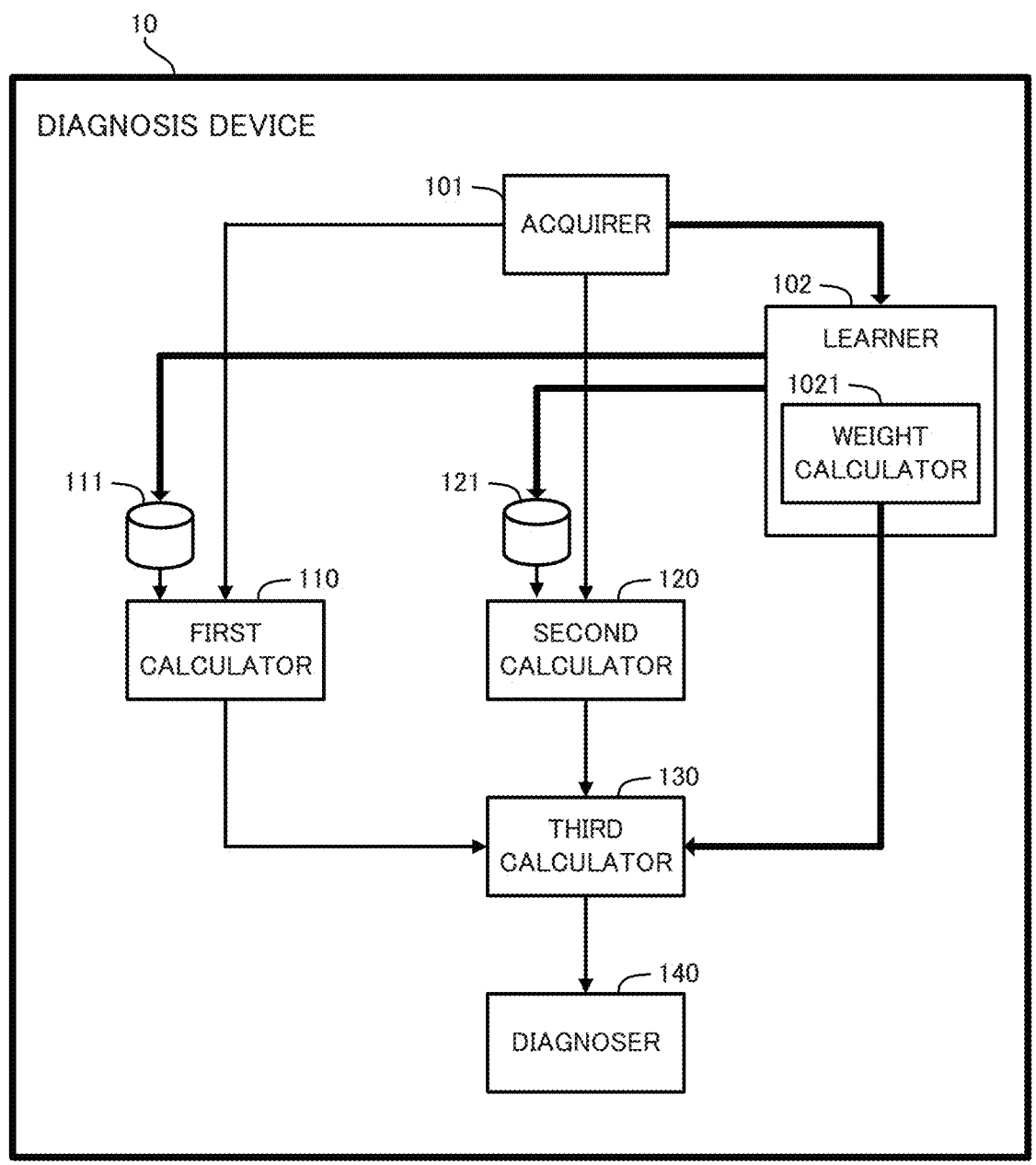
FIG. 5 is a diagram of a functional configuration of the diagnosis device according to Embodiment 1.

As illustrated in FIG. 5, the diagnosis device 10 includes, as functions, (i) an acquirer 101 that acquires the learning signal and the input signal, (ii) a learner 102 that learns, from the learning signal, the first reference vector and the second reference vector that indicate a waveform that the input signal is to have in the normal state, (iii) a storage 111 that stores the first reference vector learned by the learner 102, (iv) a storage 121 that stores the second reference vector learned by the learner 102, (v) a first calculator 110 that calculates the first index value indicating the distance between the input vector as an input signal and the first reference vector, (vi) a second calculator 120 that calculates the second index value indicating the angle between the input vector and the second reference vector, (vii) a third calculator 130 that calculates an output value obtained by combining the first index value and the second index value, and (viii) a diagnoser 140 that diagnoses the presence or absence of abnormality from the output value. In FIG. 5, thick arrows indicate data flows during learning of the reference vectors from the learning signal, and thin arrows indicate data flows during calculation of the output value from the input signal after the completion of learning.

The acquirer 101 is mainly achieved by the processor 11 and the communicator 16. The acquirer 101 acquires the learning signal for learning the reference vectors and the input signal that is an object to be monitored for the presence or absence of abnormality. Specifically, the acquirer 101 acquires the learning signal provided by the user via the network 20. The learning signal is preferably a signal that is long to some extent in order to sufficiently learn the reference vectors, and the learning signal preferably includes all the waveforms of signals that are to be input in the normal state. Also, the acquirer 101 repeatedly receives data from the device 21 via the network 20, thereby receiving the input signal generated by the signal source 211. The acquirer 101 functions as acquisition means recited in the claims.

The learner 102 is mainly achieved by the processor 11. The learner 102 learns, from the learning signal acquired by the acquirer 101, the first reference vector for calculating the first index value and the second reference vector for calculating the second index value. Also, the learner 102 includes a weight calculator 1021 that calculates weights of the first reference vector and the second reference vector in accordance with the result of the learning. The weights calculated by the weight calculator 1021 are supplied to the third calculator 130. The learner 102 functions as learning means recited in the claims.

In this case, an outline of learning of the reference vectors by the learner 102 is described with reference to FIG. 6. The learning signal is illustrated in the top portion of FIG. 6. This learning signal has, as waveforms that the input signal is to have in the normal state, (i) a waveform 301 that rises steeply and then falls gently, (ii) a trapezoidal waveform 302, and (iii) a waveform 303 that rises gently and then falls steeply. The learner 102 divides this learning signal into a learning partial signal for learning the reference vectors and a trial signal for calculating the weights.

In order for the learner 102 to learn the reference vectors, a vector extracted from the learning signal is used similarly to the extraction of the input vector from the input signal. The learning signal is a time-series signal of learning values that are sampling values, and the partial signal cut out from the learning signal is a sequence of the learning values over time and is expressed as a vector. Hereinafter, the vector corresponding to the partial signal cut out from the learning signal is referred to as a learning vector.

Figure 6:
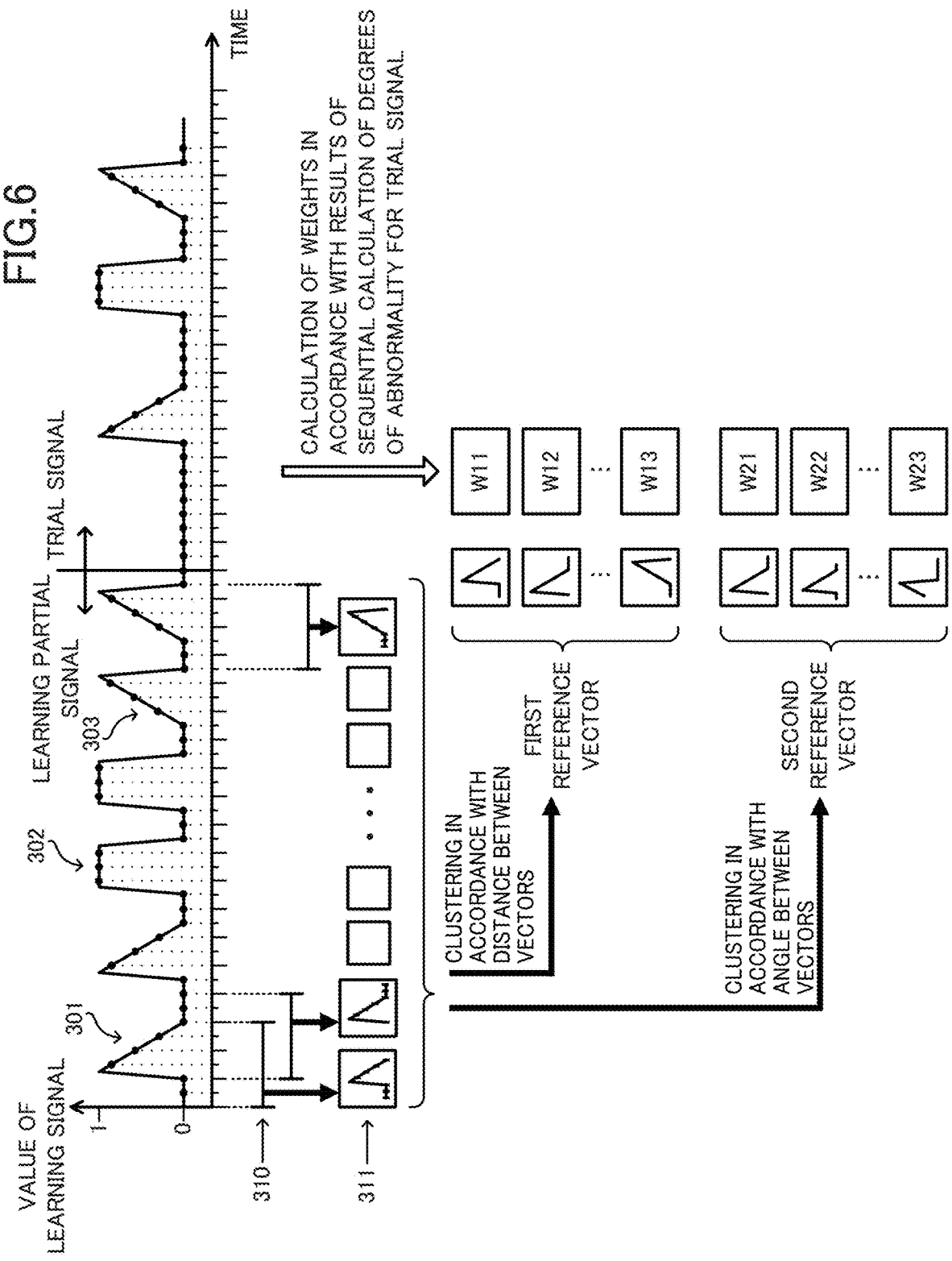
FIG. 6 is a view illustrating a summary of learning of a reference vector according to Embodiment 1.

Specifically, as illustrated in FIG. 6, each time the window 310 is slid, the learner 102 performs cropping of the series of learning values from the learning partial signal, thereby generating learning vectors 311 each having the learning values of this series as components. Subsequently, the learner 102 learns one or more first reference vectors representing the learning vectors 311 by performing clustering of the multiple learning vectors 311 in accordance with distances between the learning vectors 311. The learner 102 learns one or more second reference vectors representing the learning vectors 311 by performing the clustering in accordance with angles between the learning vectors 311.

In this case, a distance between vectors is a distance between one vector and another vector and is, for example, a Euclidean distance corresponding to the square root of the sum of square errors of respective components of the vectors. However, the present disclosure is not limited to such a distance, and the distance between vectors may be a Manhattan distance, a distance defined by dynamic time warping (DTW), or another distance.

Also, the angle between vectors is an angle between one vector and another vector and is a quantity expressed in degree or radian units. For example, this angle can be obtained as arccos (x), in which the symbol x denotes a value obtained by dividing the inner product of one vector and another vector by the magnitude of the one vector and the magnitude of the other vector.

Clustering in accordance with the distances between the learning vectors 311 means that a distance is used as a criterion for clustering of the multiple learning vectors 311, and clustering in accordance with the angle between the learning vectors 311 means that the angle is used as a criterion for clustering of the multiple learning vectors 311.

The clustering of the vectors is to group multiple vectors into clusters of vectors similar to one another based on a certain criterion. Normally, the multiple vectors are sorted into respective clusters. A freely-selected clustering method may be used, and for example, a k-means method or a Gaussian mixture model (GMM) may be employed. The method for clustering in accordance with the distance may be different from the method for clustering in accordance with the angle. Additionally, the number of clusters may be determined in advance, or an appropriate number of clusters may be determined using a criterion as typified by the Akaike information criterion (AIC).

The first reference vector and the second reference vector may be vectors of centers of clusters or may be one of the learning vectors 311 that represents the respective cluster. Usually, vectors corresponding to respective multiple clusters formed by clustering in accordance with the distance are learned as the first reference vectors. That is, multiple vectors are learned as the first reference vectors. Also, vectors corresponding to respective multiple clusters in accordance with the angle are learned as the second reference vectors. That is, multiple vectors are learned as the second reference vectors.

For example, in a case in which one vector belongs to one cluster as a result of clustering in accordance with the distance, a distance between the one vector and the first reference vector corresponding to the one cluster is less than a distance between the one vector and each of the first reference vectors corresponding to the other clusters. Similarly, in a case in which one vector belongs to one cluster as a result of clustering according to the angle, an angle between the one vector and the second reference vector corresponding to the one cluster is less than a distance between the one vector and the second reference vector corresponding to each of the other clusters.

However, a case may be envisioned in which only a single cluster is formed as a result of clustering. For example, in a case in which the waveform to be input in the normal state has one fixed pattern and this pattern appears at a period equal to the shift width of the window 310 illustrated in FIG. 6, substantially similar learning vectors 311 may be clustered into one cluster.

Again with reference to FIG. 5, the weight calculator 1021 of the learner 102 calculates a weight of the first reference vector in accordance with a result of calculating a degree of similarity for the trial signal in FIG. 6 using the first reference vector by the method illustrated in FIG. 4. Also, the weight calculator 1021 calculates a weight of the second reference vector in accordance with a result of calculating a degree of similarity using the second reference vector for the trial signal by the method illustrated in FIG. 4.

The degree of similarity calculated using the first reference vector is calculated by normalizing a distance between vectors so as to fall within the range of zero to one. If the vectors are identical to each other, the distance between the vectors is zero and the degree of similarity is one. For example, when the distance between the vectors is expressed by a symbol D, the degree of similarity E is calculated as $E=1/(1+D)$. However, the calculation formula for obtaining the degree of similarity E is not limited to the above-described formula and is freely selectable.

Also, the degree of similarity calculated using the second reference vector is a value in the range from zero to 1 in accordance with the angle between vectors. If the angle between the vectors is zero, the degree of similarity is one. For example, when the angle between the vectors is expressed by a symbol θ, the degree of similarity F is calculated as F=(cos θ/2)+(½). In this case, when the components of a vector A are (a1, a2) and the components of a vector B are (b1, b2), the cosine cos θ is calculated by the following equation (1).

$$\cos θ=(A·B)/|A||B|=(a1·b1+a2·b2)/((a1^2+a2^2)^{1/2}(b1^2·b2^2)^{1/2}) \quad (1)$$

In a case in which the vectors A and B are three-dimensional vectors, when the components of the vector A are (a1, a2, a3) and the components of the vector B are (b1, b2, b3), the cosine cos θ is calculated by the following equation (2).

$$\cos θ=(A·B)/|A||B|=(a1·b1+a2·b2+a3·b3)/((a1^2+a2^2+a3^2)^{1/2}(b1^2+b2^2+b3^2)^{1/2}) \quad (2)$$

In this case, the symbol, "A·B", in the above equations (1) and (2) means an inner product of vectors, and the symbol, "a1·b1", means multiplication of components. The degree of similarity with the second reference vector may be calculated by another method in accordance with the angle between the vectors. For example, the degree of similarity F may be calculated using the equation F=1/(1+|θ|), where the symbol θ denotes the angle between vectors.

Figure 7:
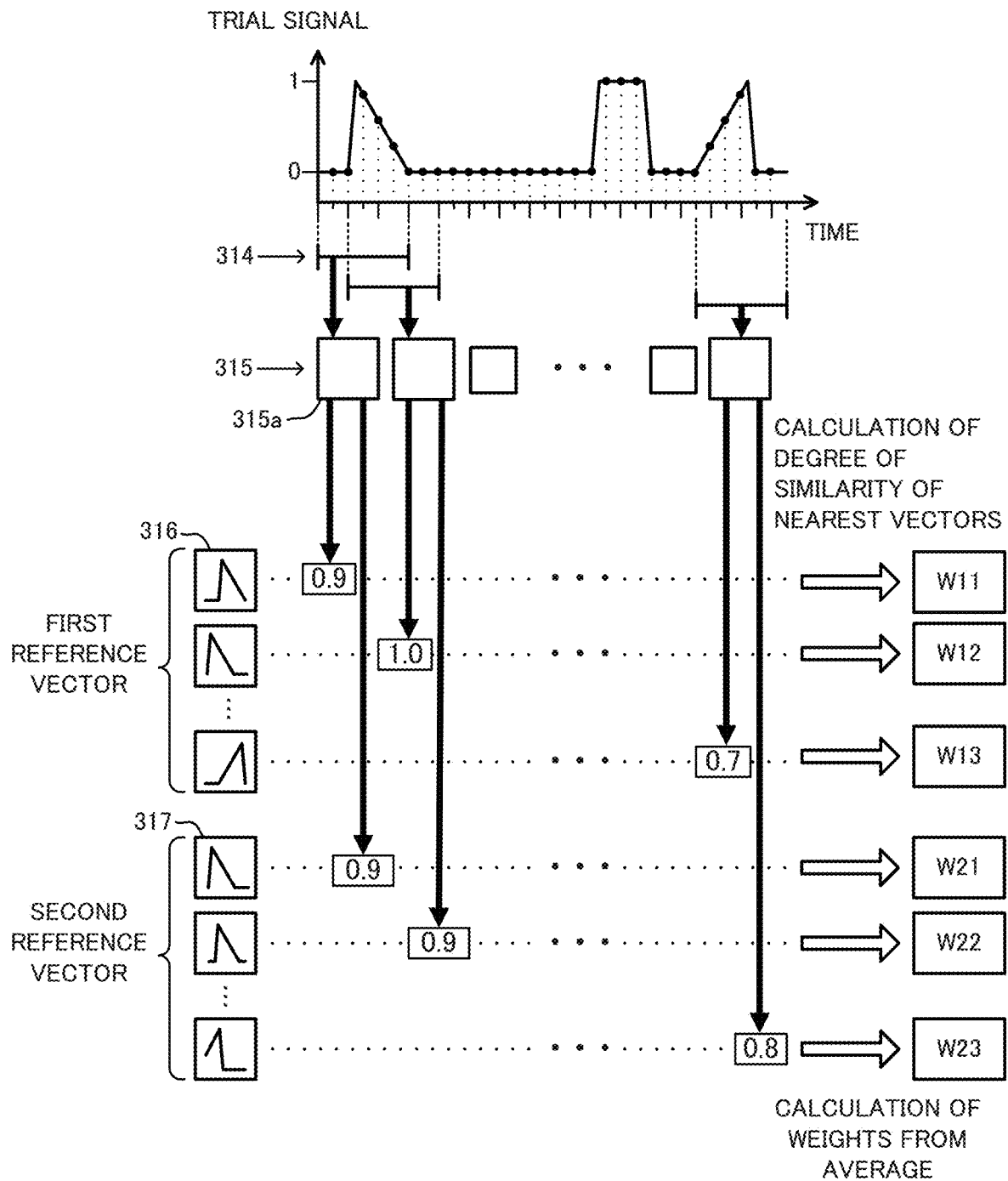
FIG. 7 is a view illustrating a summary of calculation of a weight according to Embodiment 1.

FIG. 7 illustrates a summary of calculation of weights by the weight calculator 1021. The weight calculator 1021 slides a window 314 to cut out a series of trial values from the trial signal, thereby generating multiple trial vectors 315 having the trial values of this series as components. The weight calculator 1021 selects, from the first reference vectors, a nearest vector to each of the trial vectors 315 and selects, from the second reference vectors, a nearest vector to each of the trial vectors 315. Specifically, for each trial vector 315, the weight calculator 1021 selects, from the multiple first reference vectors, a first reference vector having the highest degree of similarity to the trial vector 315 and selects, from the multiple second reference vectors, a second reference vector having the highest degree of similarity to the trial vector 315.

For each first reference vector, a degree of similarity is calculated each time the first reference vector is selected as the nearest vector, and for each second reference vector, a degree of similarity is calculated each time the second reference vector is selected as the nearest vector. FIG. 7 illustrates an example of the degree of similarity calculated for each reference vector. For example, for a trial vector 315a that is one of the trial vectors 315 illustrated on the upper portion of FIG. 7, when a degree of similarity between the trial vector 315a and each of the multiple first reference vectors is calculated, a value 0.9 of a degree of similarity between the trial vector 315a and a first reference vector 316 is the highest value. Also, when a degree of similarity between the trial vector 315a and each of the multiple second reference vectors is calculated, a value 0.9 of a degree of similarity between the trial vector 315a and a second reference vector 317 is the highest value. In FIG. 7, for other trial vectors 315, numerical values indicating a degree of similarity to the nearest vector among the first reference vectors are illustrated with the numerical values surrounded by squares, and numerical values indicating a degree of similarity to the nearest vector among the second reference vectors are illustrated with the numerical numbers surrounded by squares.

Additionally, the weight calculator 1021 calculates the weight of each of the first reference vectors such that the weight has a greater value with increase in the average value of the calculated degrees of similarity. Also, the weight calculator 1021 calculates the weight of each of the second reference vectors such that the value of the weight increases with increase in the average value of the calculated degrees of similarity. In other words, the more a reference vector matches the waveform of a trial signal, the higher weight the reference vector is given. For example, the weight calculator 1021 uses, as the weight, the average value of the degrees of similarity as it is. In the lower portion of FIG. 7, for each reference vector, the average value of the numerical values appearing in the horizontal direction is calculated as a weight corresponding to the reference vector.

Again with reference to FIG. 5, the learner 102 stores the learned first reference vector in the storage 111 and stores the learned second reference vector in the storage 121. The storages 111 and 121 are mainly achieved by the auxiliary storage 13.

The first calculator 110 is mainly achieved by the processor 11. The first calculator 110 treats, as an input vector having respective input values of the series as components, a series of input values acquired as an input signal by the acquirer 101. The number of dimensions of this input vector is equal to the number of the input values constituting the series acquired by the acquirer 101. Also, the first calculator 110 calculates a degree of similarity by the method illustrated in FIGS. 3 and 4. Specifically, the first calculator 110 (i) compares the input vector with each of the multiple first reference vectors to calculate the degrees of similarity and (ii) outputs the highest degree of similarity as the first index value. More specifically, the first calculator 110 outputs a first index value indicating the distance between the input vector and the nearest first reference vector.

The second calculator 120 is mainly achieved by the processor 11. Like the first calculator 110, the second calculator 120 (i) compares the input vector with the second reference vectors to calculate the degrees of similarity by the method illustrated in FIGS. 3 and 4 and (ii) outputs the highest degree of similarity as the second index value. Specifically, the second calculator 120 outputs a second index value indicating the angle between the input vector and the nearest second reference vector.

The third calculator 130 is mainly achieved by the processor 11. The third calculator 130 calculates an output value as a weighted sum of the first index value calculated by the first calculator 110 and the second index value calculated by the second calculator 120. Specifically, the third calculator 130 calculates an output value A3 by the calculation expressed by the following equation (3).

$$A3=w1·A1+w2·A2 \quad (3)$$

In this case, the symbol A1 denotes the first index value and the symbol A2 denotes the second index value. The symbol w1 denotes a weighting coefficient of the first index value and is the weight of the nearest first reference vector selected by the first calculator 110 during calculation of the first index value. The symbol w2 denotes a weighting coefficient of the second index value and is the weight of the nearest second reference vector selected by the second calculator 120 during calculation of the second index value. The third calculator 130 acquires these weights from the learner 102 in advance and stores these weights. Normally, the magnitudes of the coefficients w1 and w2 are adjusted so that the sum of these coefficients is 1.0, and the output value becomes a value within the range from zero to one.

The diagnoser 140 is mainly achieved by the processor 11, the outputter 15, or the communicator 16. The diagnoser 140 diagnoses the presence or absence of abnormality based on the output value calculated by the third calculator 130. For example, the diagnoser 140 determines whether the output value exceeds a threshold value, thereby determining whether there is an abnormality. This threshold is, for example, 0.8 and may be defined in advance or may be changed by the user. The output of information on a result of the diagnosis by the diagnoser 140 may be presented to the user through a screen display, may be output to a signal processing circuit included in the diagnosis device 10, or may be performed by data transmission via the network 20. The diagnoser 140 functions as diagnosis means recited in the claims.

Figure 8:
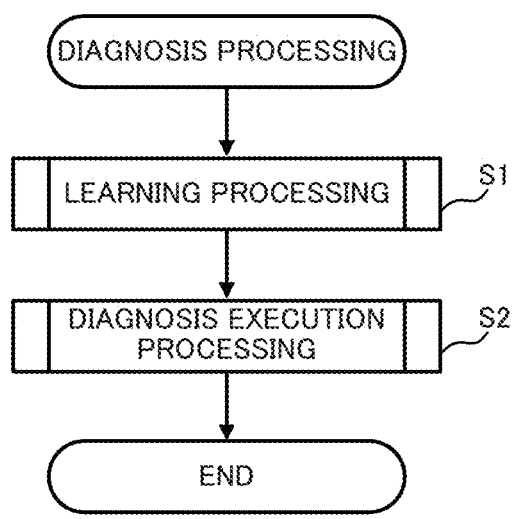
FIG. 8 is a flow chart illustrating diagnosis processing according to Embodiment 1.

Subsequently, diagnosis processing executed by the diagnosis device 10 is described with reference to FIGS. 8 to 12. The diagnosis processing illustrated in FIG. 8 is started by turning on the diagnosis device 10.

In the diagnosis processing, the diagnosis device 10 executes learning processing (step S1) and executes diagnosis execution processing (step S2). Hereinafter, the learning processing and the diagnosis execution processing are described in order.

Figure 9:
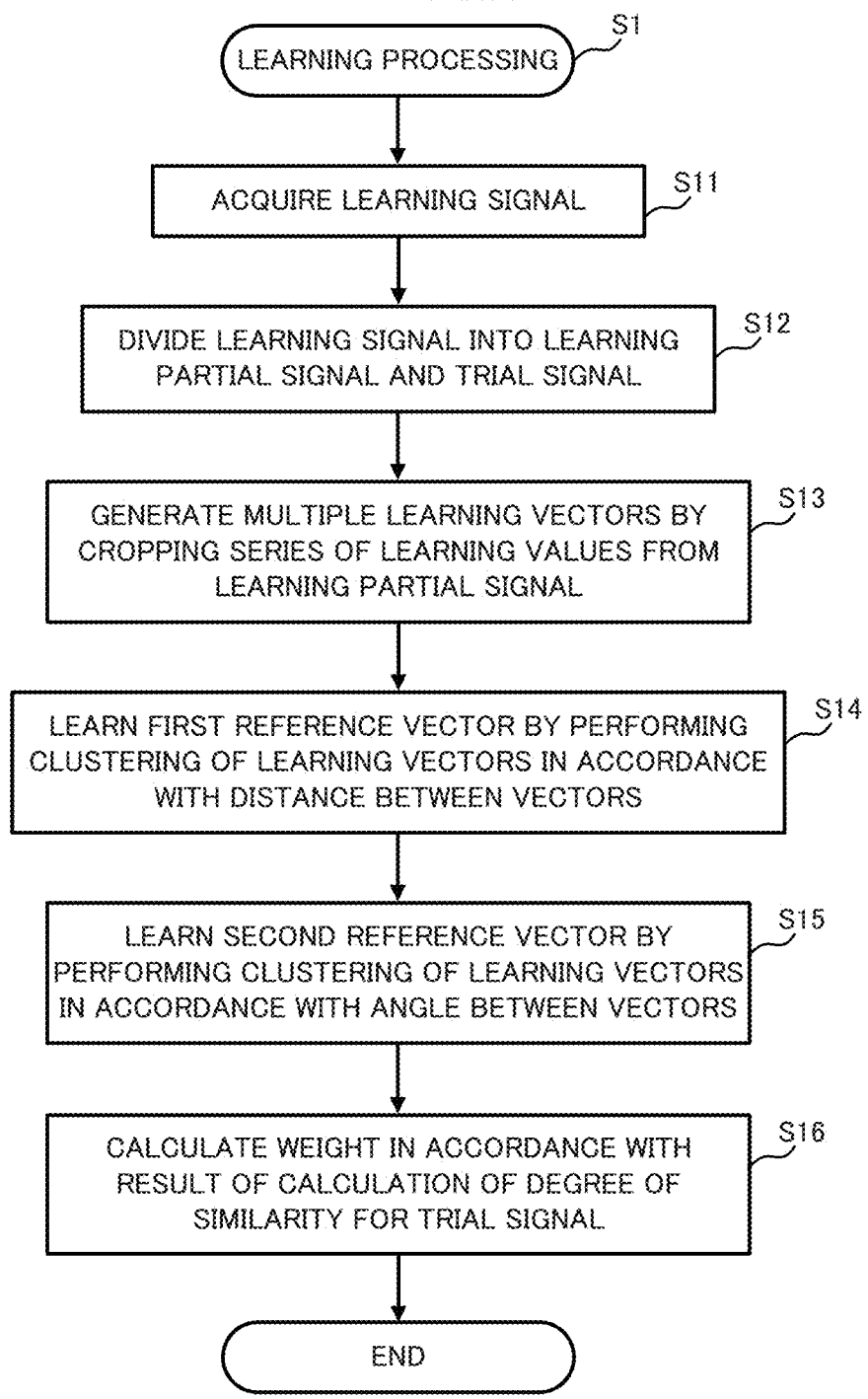
FIG. 9 is a flow chart illustrating learning processing according to Embodiment 1.

FIG. 9 illustrates a procedure of the learning processing. The learning processing is a process of learning the reference vectors from the learning signal and is mainly executed by the learner 102.

In the learning processing, the acquirer 101 acquires a learning signal (step S11). Specifically, the acquirer 101 acquires data indicating the learning signal and extracts the learning signal from the data.

Next, the learner 102 divides the learning signal acquired in step S11 into a learning partial signal and a trial signal (step S12). Specifically, the learner 102 equally divides the learning signal into a former stage and a latter stage. However, such a division method is freely selectable, and the learning signal may be divided by another method.

Next, the learner 102 generates multiple learning vectors by cropping a series of learning values from the learning partial signal (step S13). Additionally, the learner 102 (i) learns first reference vectors by clustering the learning vectors in accordance with distances between the vectors (step S14) and (ii) learns second reference vectors by clustering the learning vectors in accordance with angles between the vectors (step S15).

Next, the learner 102 calculates a weight in accordance with results of calculation of degrees of similarity for the trial signal (step S16). Specifically, the weight calculator 1021 calculates weights of the first reference vectors and the second reference vectors in accordance with results of comparisons of the trial signal with the first reference vector and the second reference vector. Thereafter, the learning processing ends, and the process performed by the diagnosis device 10 returns to the diagnosis processing illustrated in FIG. 8.

Figure 10:
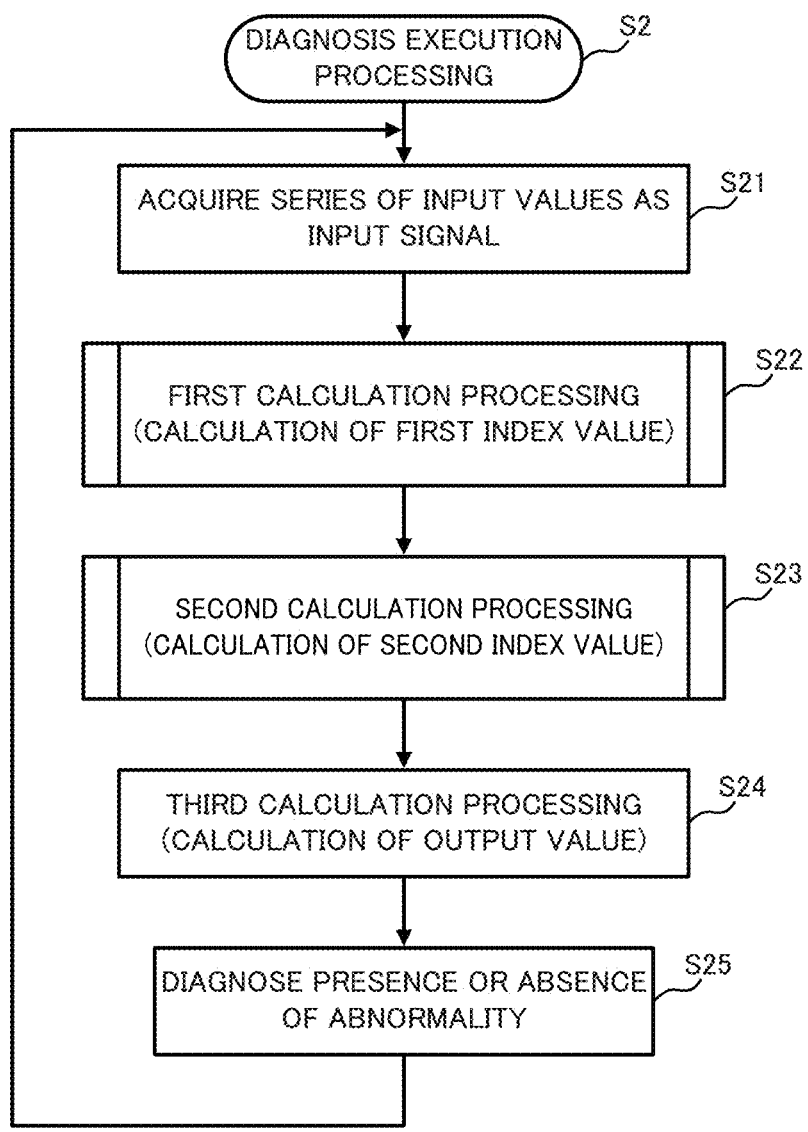
FIG. 10 is a flow chart illustrating diagnosis execution processing according to Embodiment 1.

Subsequently, the diagnosis execution processing is described with reference to FIG. 10. The diagnosis execution processing is a process for diagnosing presence or absence of abnormality by calculating an output value from an input signal.

In the diagnosis execution processing, the acquirer 101 acquires a series of input values as an input signal (step S21). This step S21 corresponds to an acquisition step recited in the claims. The series acquired in this step corresponds to partial signals segmented by the windows 26 illustrated in FIG. 4. The series of input values is treated, hereinafter, as an input vector whose components are the input values.

Next, first calculation processing is executed by the first calculator 110 (step S22). The first calculation processing is a process in which the first calculator 110 calculates a first index value from the input vector acquired in step S21.

Figure 11:
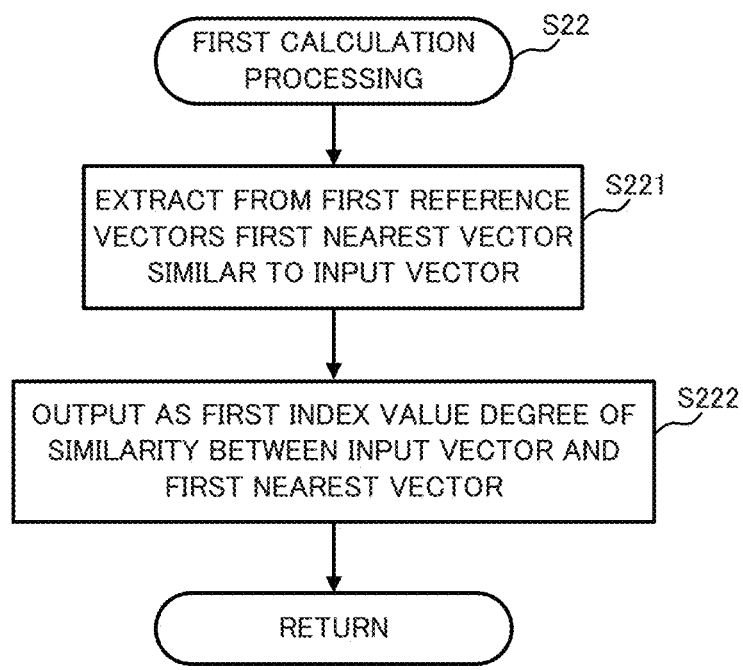
FIG. 11 is a flow chart illustrating first calculation processing according to Embodiment 1.

In the first calculation processing, as illustrated in FIG. 11, the first calculator 110 extracts, from the first reference vectors, a first nearest vector similar to the input vector (step S221). Subsequently, the first calculator 110 outputs, as the first index value, a degree of similarity between the input vector and the first nearest vector (step S222). Thereafter, the first calculation processing ends, and the process performed by the diagnosis device 10 returns to the diagnosis execution processing of FIG. 10.

Following the first calculation processing (step S22), second calculation processing is executed by the second calculator 120 (step S23). The second calculation processing is a process in which the second calculator 120 calculates a second index value from the input vector acquired in step S21.

Figure 12:
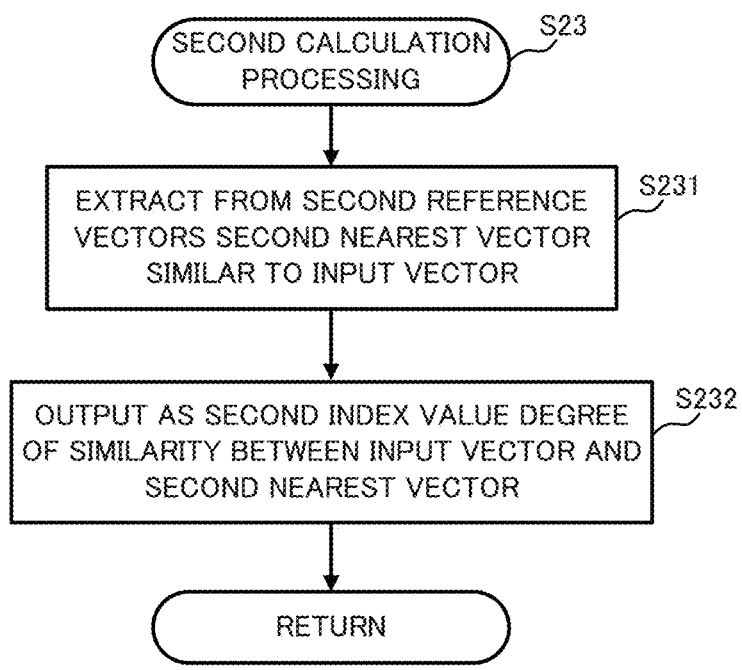
FIG. 12 is a flow chart illustrating second calculation processing according to Embodiment 1.

In the second calculation processing, as illustrated in FIG. 12, the second calculator 120 extracts, from the second reference vectors, a second nearest vector similar to the input vector (step S231). Subsequently, the second calculator 120 outputs a degree of similarity between the input vector and the second nearest vector as the second index value (step S232). Thereafter, the second calculation processing ends, and the process performed by the diagnosis device 10 returns to the diagnosis execution processing of FIG. 10.

Following the second calculation processing (step S23), the third calculator 130 executes third calculation processing (step S24). Specifically, the third calculator 130 calculates an output value as a weighted sum of the first index value calculated in step S22 and the second index value calculated in step S23.

Next, the diagnoser 140 diagnoses presence or absence of abnormality from the output value calculated in step S24 (step S25). This step S25 corresponds to a diagnosis step recited in the claims. Thereafter, the diagnosis device 10 repeats the processes after step S21. As a result, diagnosis of presence or absence of abnormalities in the input vectors sequentially cut out from the input signal is performed similarly to the sequential calculation of the degrees of similarity by sliding the window 26 illustrated in FIG. 4.

As described above, according to the diagnosis device 10, presence or absence of abnormality is diagnosed from (i) the first index value indicating the distance between the input vector and the first reference vector and (ii) the second index value indicating the angle between the input vector and the second reference vector. Accordingly, accurate diagnosis based on the angle between the vectors is expected even when the use of only the distance between the vectors would cause erroneous diagnosis. Thus, the diagnostic accuracy of the presence or absence of abnormality can be improved.

Figure 13:
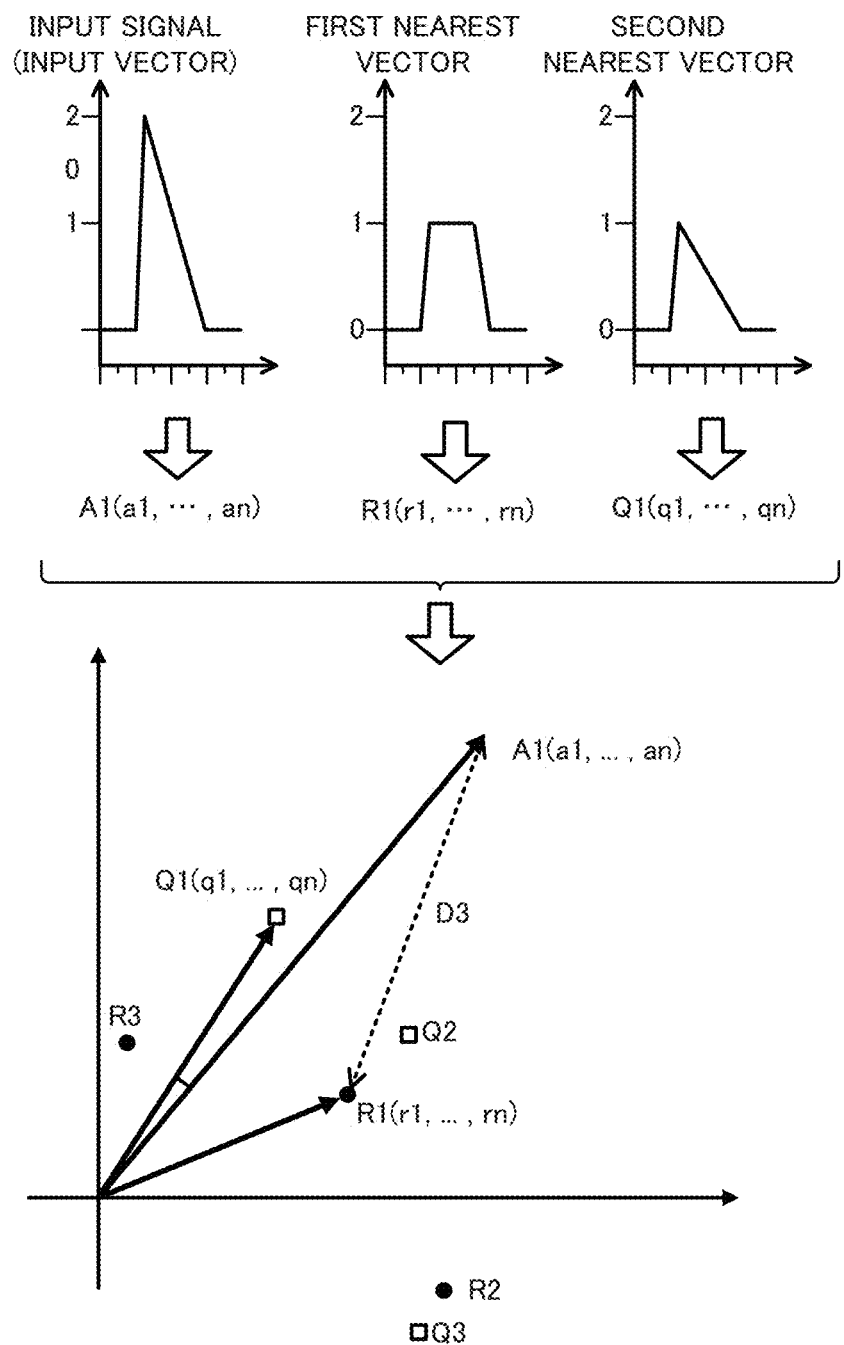
FIG. 13 is an explanatory view for illustrating an effect of the diagnosis device according to Embodiment 1.

Here, a specific example is described with reference to FIG. 13. FIG. 13 illustrates an example in which the input signal has a waveform that rises steeply and falls gently and each input value is twice the value of the learning signal. For the input vector A1 as the input signal, from among first reference vectors R1, R2 and R3 indicated by black circles at the lower portion of FIG. 13, the first reference vector R1 having the shortest Euclidean distance is selected as the first nearest vector R1. Specifically, when the distance between the vectors is used as a criterion, the vector nearest to the vector A1 of the first reference vectors R1, R2, and R3 is the vector R1, and the waveform of the vector R1 is a trapezoid as illustrated in the upper portion of FIG. 13. However, the scale of the waveform of the input vector is simply changed from the scale at the time of learning, and if the scale of the waveform of the input vector is compared with the trapezoidal waveform, the presence or absence of abnormality cannot be correctly diagnosed.

On the other hand, for the input vector A1, among second reference vectors Q1, Q2, and Q3 indicated by white square marks at the lower portion of FIG. 13, the second reference vector Q1 having the smallest angle with the input vector A1 is selected as the second nearest vector. That is, when the angle between the vectors is used as a criterion, the vector closest to the vector A1 of the second reference vectors Q1, Q2 and Q3 is the vector Q1, and the waveform of the vector Q1 rises steeply and then falls gently as illustrated in the upper portion of FIG. 13. Accordingly, when the waveform in which the magnitude of the value of the input signal has changed is to be diagnosed as normal, the second index value can be said to correctly represent the degree of similarity between the waveforms.

Additionally, the diagnosis device 10 calculates an output value by combining the first index value and the second index value. Accordingly, abnormality diagnosis by the diagnosis device 10 is expected to be performed more accurately than as in the case in which the diagnosis is performed based on only the distance between the vectors. Specifically, even when the scale of the value of the input signal can be changed in the normal state, since the second index value based on the angle between the vectors is taken into account to diagnose the presence or absence of abnormality, a rate of occurrence of a false diagnosis is expected to be reduced.

Also, the diagnoser 140 diagnoses the presence or absence of abnormality from the output value calculated by the third calculator as a weighted sum of the first index value and the second index value. Accordingly, sequential execution of diagnosis with a relatively small calculation load necessary for diagnosis can be easily achieved.

Also, the learner 102 learns the reference vectors from the learning signal, and the weights of the reference vectors are calculated in accordance with results of the learning. Accordingly, the first index value and the second index value are given weights in accordance with the learning, thereby enabling diagnosis of the presence or absence of abnormality. The learning signal is a signal indicating a waveform to be input at the normal time, and the waveforms in the normal state that are indicated by the learning signal have a certain degree of variance. More accurate diagnosis is considered to be capable of being made by assigning, to the reference vectors, such weights that are calculated in consideration of such variance.

In addition, the learner 102 learns the reference vectors by clustering the learning vectors. When all of many waveforms included in the learning signal are handled as the reference vectors, a calculation amount becomes excessively large. On the other hand, the learner 102 can efficiently learn the reference vectors used for diagnosis by performing clustering.

In addition, the learner 102 divides the learning signal into the learning partial signal and the trial signal, learns the reference vectors from the learning partial signal, and calculates the weights of the reference vectors from the trial signal. The trial signal can be said to be a signal for attempting to calculate the degrees of similarity using the learned reference vectors. Effective weights are expected to be calculated in the subsequent diagnosis execution processing by obtaining the weights using signals different from the signals for learning the reference vectors.

Although the weight calculator 1021 calculates, as weights, the average value of the degrees of similarity calculated when the reference vectors are selected as the nearest vectors of the trial vectors, the present disclosure is not limited to such a configuration. For example, the weight calculator 1021 may calculate the weights in accordance with changes in degrees of similarity calculated for the trial vectors. Specifically, the weight calculator 1021 may calculate greater weights with decrease in the change in the degrees of similarity. As such weights, for example, weights corresponding to a statistical value typified by a standard deviation of the degrees of similarity can be considered.

Embodiment 2

Next, Embodiment 2 is described with a focus on differences from Embodiment 1 described above. Also, components that are the same as or equivalent to those of the above-described embodiment are assigned the same reference sign, and the descriptions of these components are omitted or abbreviated. In Embodiment 1, the weights assigned to the first reference vectors and the second reference vectors are calculated from the learning signal. However, another embodiment is also conceivable. Hereinafter, an example in which the weights are determined based on magnitude of the index values is described.

Figure 14:
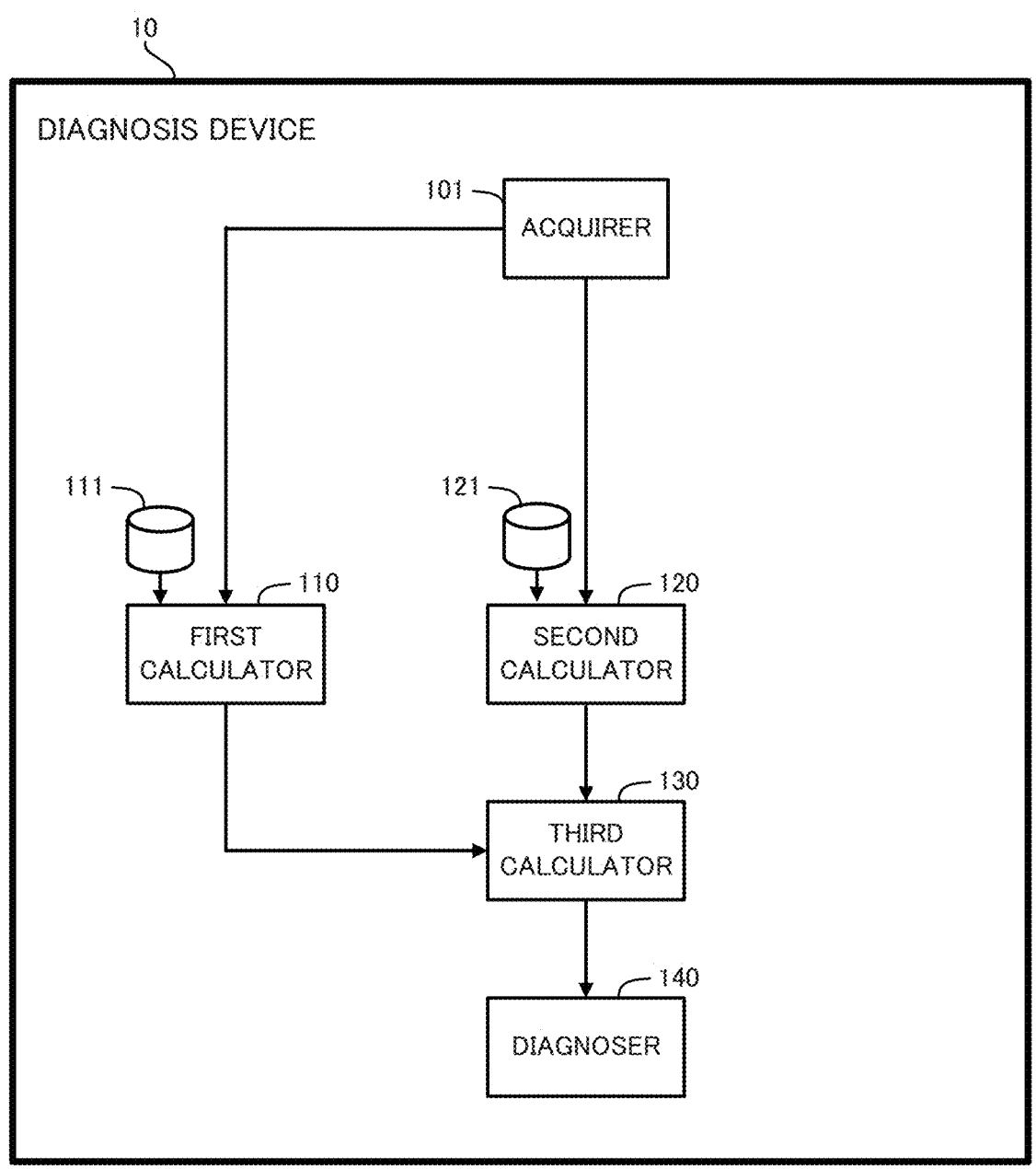
FIG. 14 is a diagram of a functional configuration of a diagnosis device according to Embodiment 2.

Diagnosis device 10 according to the present embodiment is configured by omitting the learner 102 as illustrated in FIG. 14. The first reference vectors and the second reference vectors are stored in the storages 111 and 121 in advance by the user. Additionally, every time the first index value and the second index value are calculated, the third calculator 130 determines weights to be multiplied by these index values and then calculates the output value.

Figure 15:
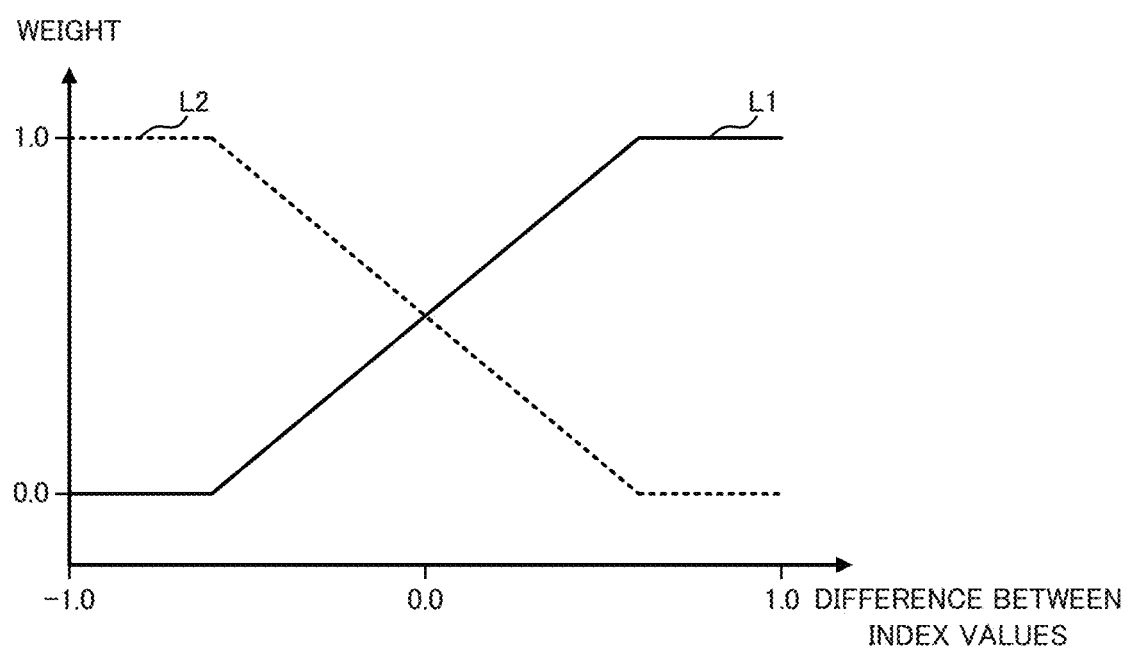
FIG. 15 is a graph illustrating a relationship between (i) a difference between index values and (ii) a weight according to Embodiment 2.

FIG. 15 illustrates a relationship between (i) a difference between the first and second index values and (ii) a weight. Specifically, for a difference obtained by subtracting the second index value from the first index value, a weight of the first index value is indicated by line L1, and a weight of the second index value is indicated by line L2. These lines L1 and L2 indicate that (i) the weighting coefficient of the greater of the first index value and the second index value is increased, and (ii) these weighting coefficients are made equal to each other when the first index value and the second index value are equal to each other.

As described above, the third calculator 130 calculates an output value that puts weight on the greater of the first index value and the second index value. As a result, when the distance or angle between the input vector and the reference vector is small, the output value indicating a degree of similarity between the waveforms becomes great. This output value can be used for more accurate diagnosis of abnormality.

Figure 16:
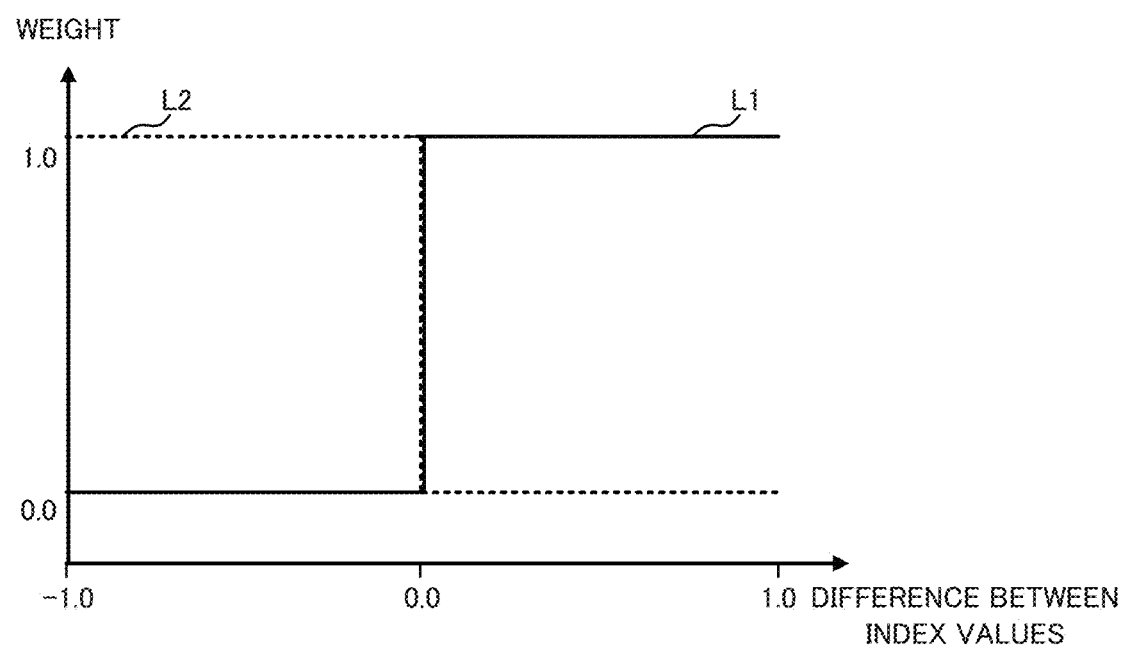
FIG. 16 is a graph illustrating a relationship between (i) a difference between index values and (ii) a weight according to a modified example of Embodiment 2.

The determination of the weights by the third calculator 130 is not limited to the example illustrated in FIG. 15. For example, as illustrated in FIG. 16, the weight of one of the first index value and the second index value may be set to 1, and the weight of the other may be set to zero. In the example of FIG. 16, the greater of the first index value and the second index value is substantially used as the output value.

Figure 17:
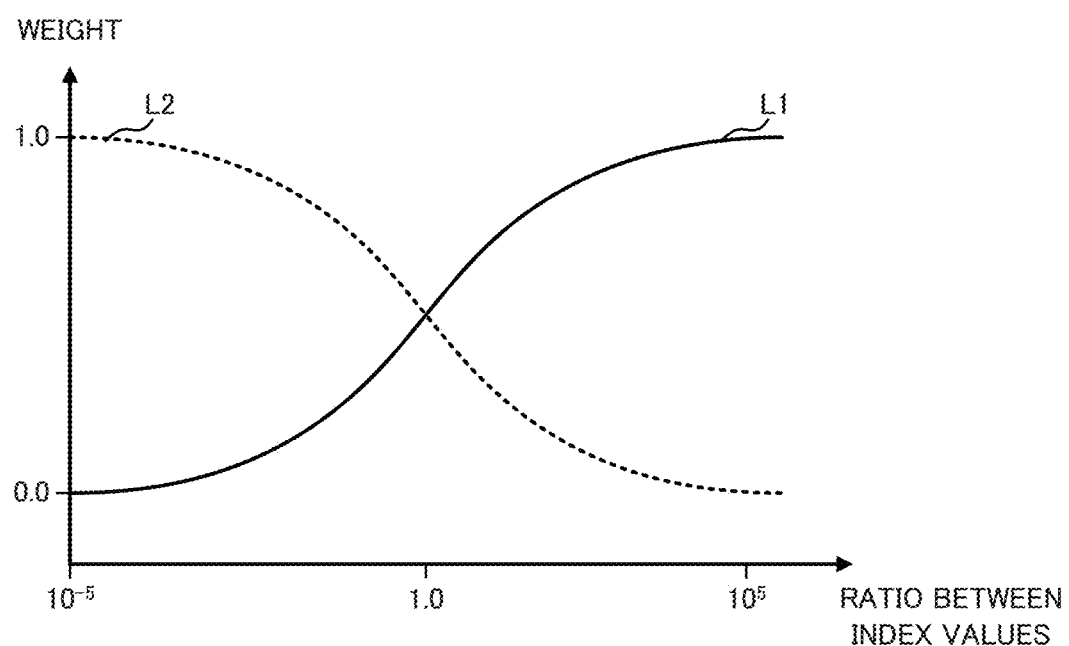
FIG. 17 is a graph illustrating a relationship between a ratio of the index values and the weight according to the modified example of Embodiment 2.

Also, as illustrated in FIG. 17, weights may be determined with respect to the ratio between the first index value and the second index value. In the example of FIG. 17, the reciprocal of the quotient obtained by dividing the first index value by the second index value is used as the weight of the first index value.

Embodiment 3

Next, Embodiment 3 is described with a focus on differences from Embodiment 1 described above. Also, components that are the same as or equivalent to those of the above-described embodiment are assigned the same reference sign and the descriptions of these components are omitted or abbreviated. In Embodiment 1, the weights are determined using the trial signal divided from the learning signal. However, an embodiment is conceivable in which the weights are determined without dividing the learning signal. Hereinafter, an example is described in which the weights are determined in accordance with results of learning of the reference vectors without dividing the learning signal.

Figure 18:
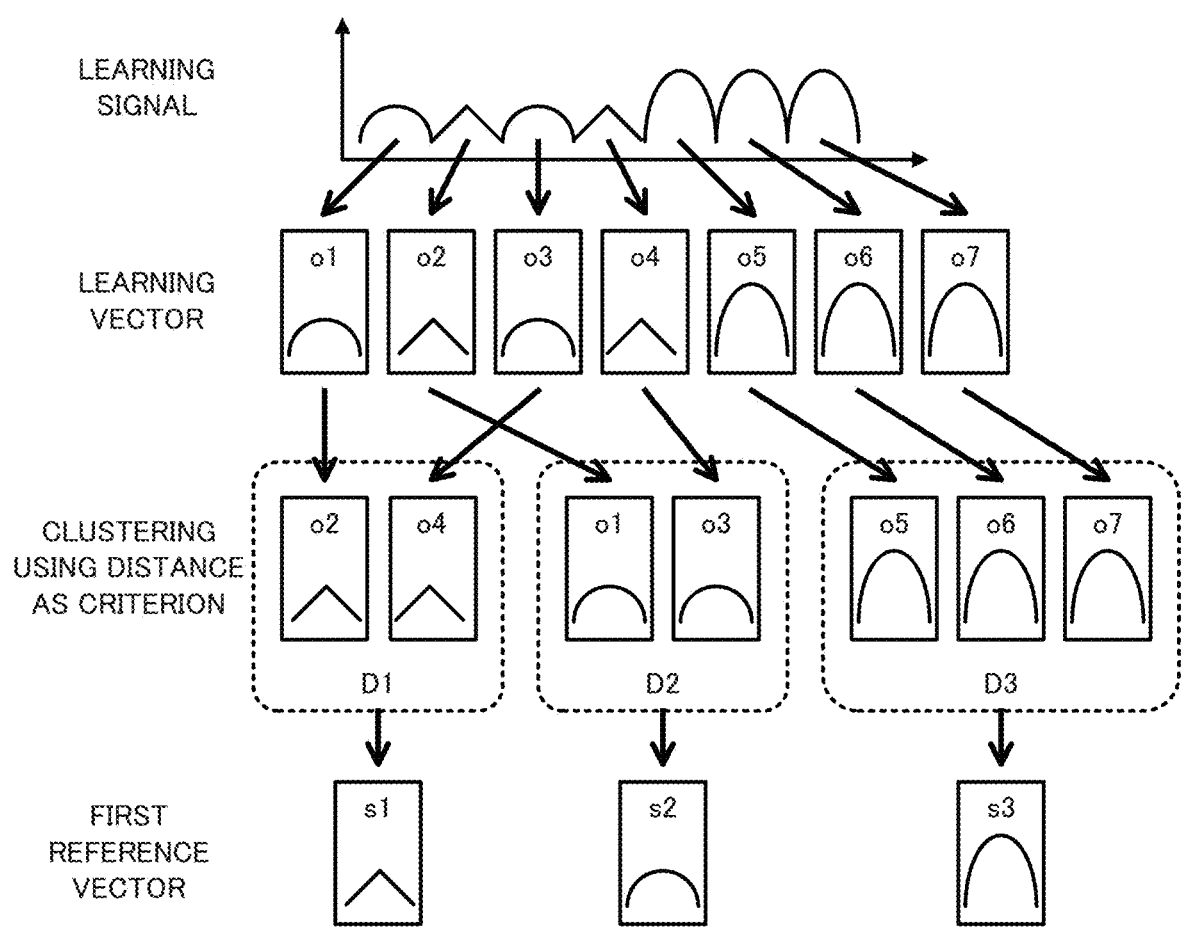
FIG. 18 is an explanatory view for illustrating learning of a first reference vector according to Embodiment 3.

FIG. 18 schematically illustrates an example in which the first reference vectors are determined from the learning signal. As a result of clustering learning vectors o1 to o7 extracted from such learning signals using the distance as a criterion, clusters D1 to D3 are formed. Then, first reference vectors s1 to s3 respectively representing the clusters D1 to D3 are generated.

Figure 19:
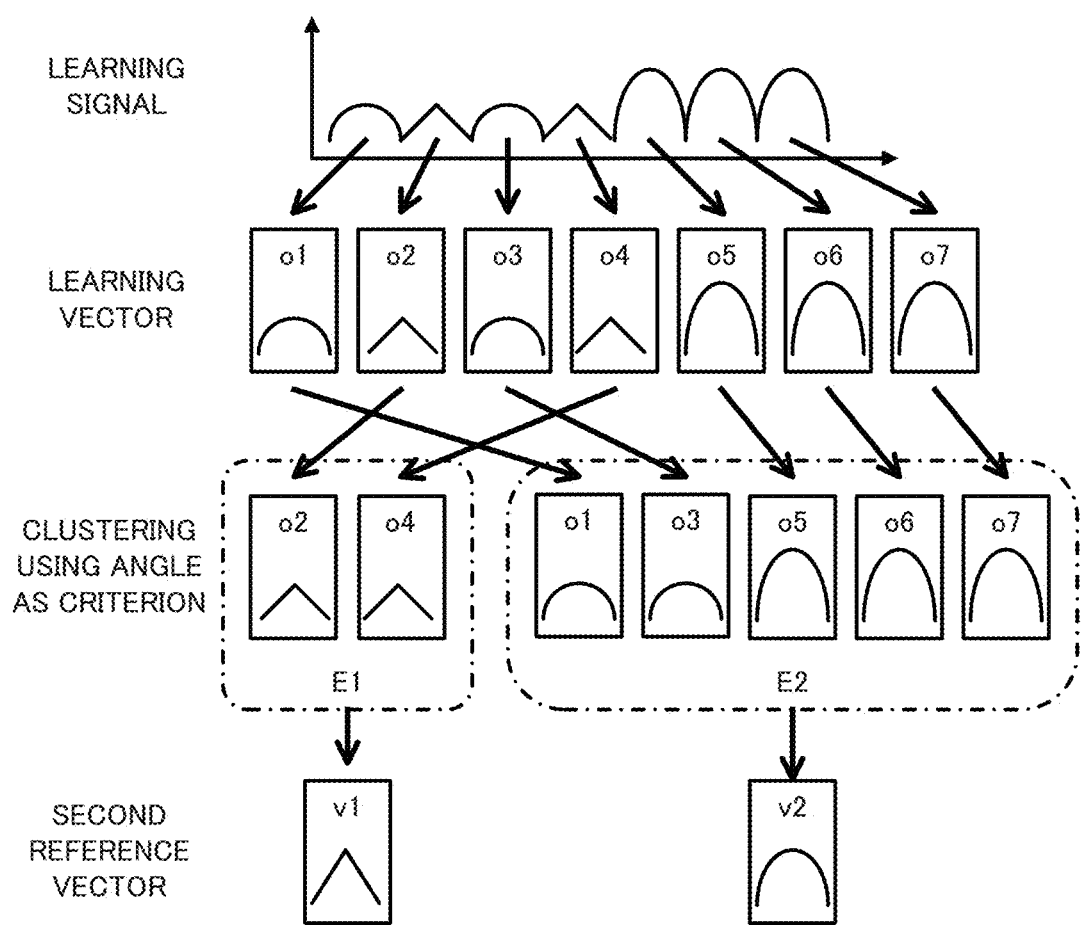
FIG. 19 is an explanatory view for illustrating learning of a second reference vector according to Embodiment 3.

FIG. 19 schematically illustrates an example in which the second reference vectors are determined from a learning signal similar to that of FIG. 18. As a result of clustering the learning vectors o1 to o7 extracted from the learning signal using the angle as a criterion, clusters E1 and E2 are formed. Additionally, second reference vectors v1 and v2 respectively representing the clusters E1 and E2 are generated.

Figure 20:
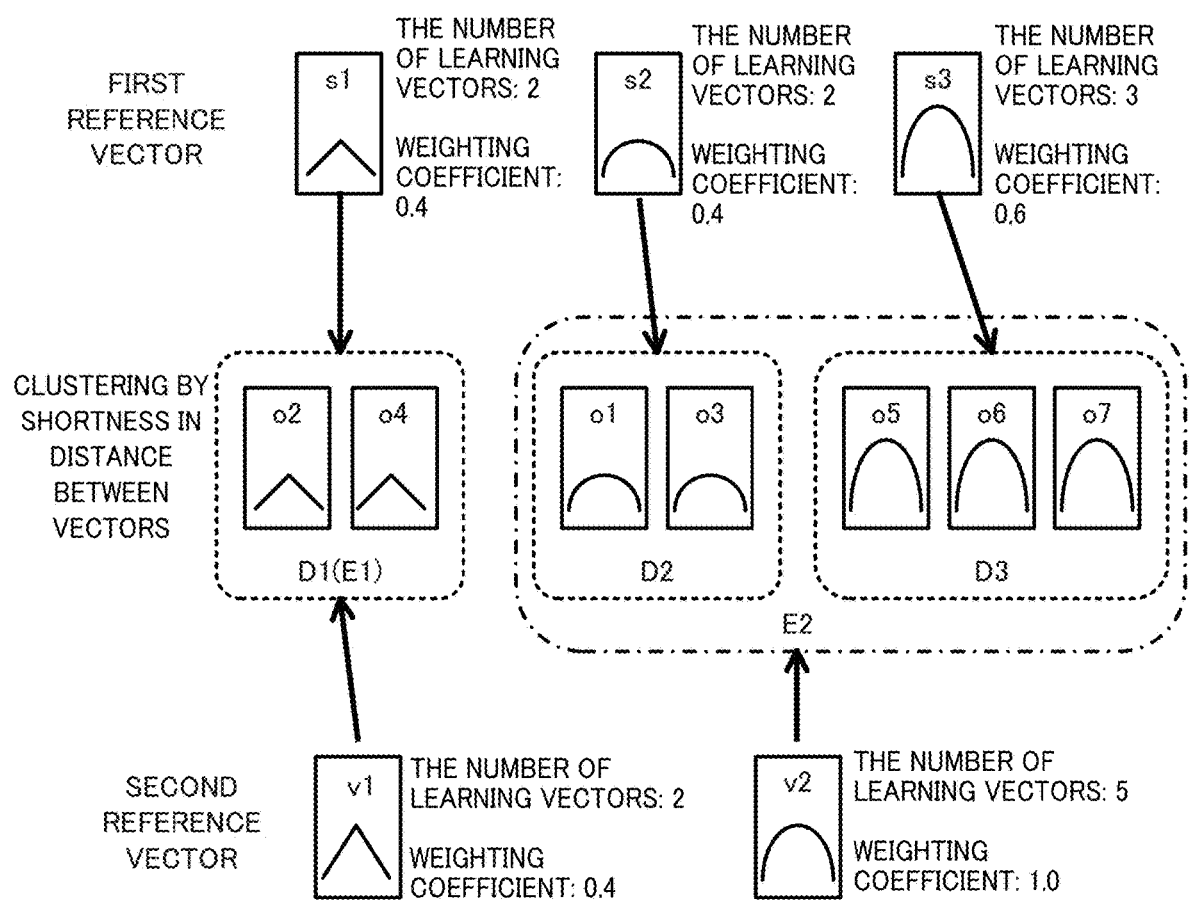
FIG. 20 is an explanatory view for illustrating calculation of a weight according to Embodiment 3.

In FIG. 20, the number of learning vectors belonging to the cluster corresponding to each first reference vector is compared with the number of learning vectors belonging to the cluster corresponding to each second reference vector. For example, the number of learning vectors used for forming a first reference vector s1 is two, and the number of learning vectors used for forming a second reference vector v2 is five.

The learner 102 determines a weighting coefficient to be given to each reference vector in accordance with the number of learning vectors belonging to a cluster corresponding to the reference vector. Specifically, the greater the number of learning vectors, the more the weighting coefficient is increased. More specifically, a weighting coefficient of 1.0 is assigned to a reference vector for which the number of learning vectors is the maximum one, and a weighting factor that is proportional to the number of learning vectors is assigned to the other reference vectors. However, the method for determining the weighting coefficient is not limited to such a method and freely selected.

Additionally, the third calculator 130 uses, for calculation of a weighted sum of the first index value and the second index value, (i) a weighting coefficient assigned to a first reference vector selected in order to calculate the first index value and (ii) a weighting coefficient assigned to a second reference vector selected in order to calculate the second index value. In this case, when the sum of the two weighting coefficients is not 1.0, the third calculator 130 may adjust the magnitudes of the weighting coefficients so that the sum becomes 1.0.

As described above, the diagnosis device 10 determines the weights in accordance with the number of the learning vectors clustered into the cluster corresponding to each reference vector. The reference vectors corresponding to many learning vectors are considered to accurately represent the waveforms that are to be input at the normal time. By assigning a great weight to such an accurate reference vector, the output value calculated by the third calculator 130 is considered to be capable of being used for accurate abnormality diagnosis.

Although different weights are assigned to the respective reference vectors, the present disclosure is not limited to such a configuration. For example, the weighting coefficients may be obtained by multiplying, by a cluster value of each cluster, a base value common to all the clusters for the first reference vectors. Similarly, the weighting coefficients may be obtained by multiplying, by the cluster value of each cluster, a base value common to all the clusters for the second reference vectors.

Figure 21:
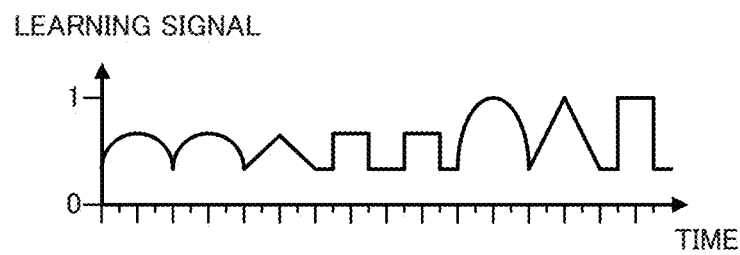
FIG. 21 is a first graph illustrating a learning signal according to a modified example of Embodiment 3.
Figure 22:
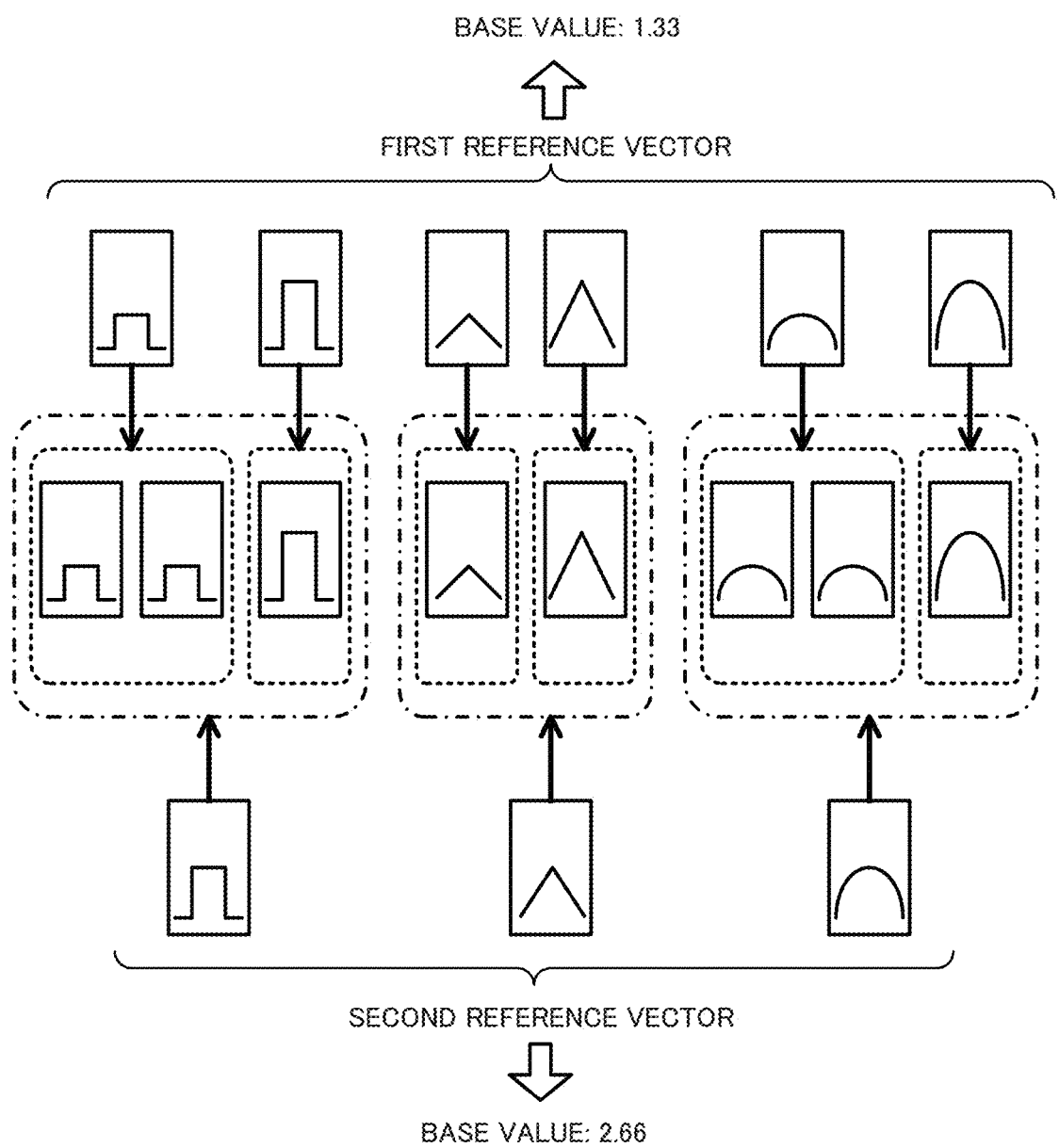
FIG. 22 is a first view for illustrating calculation of a weight according to the modified example of Embodiment 3.

The learning signal illustrated in FIG. 21 (i) includes an arc-shaped waveform, a triangular waveform, and a rectangular waveform and (ii) has multiple waveforms different from each waveform in scale. An example in which the first reference vectors and the second reference vectors are learned from such a learning signal is schematically illustrated in FIG. 22. As illustrated in FIG. 22, six first reference vectors and three second reference vectors are learned from eight learning vectors. In this example, the base value is calculated as 1.33 for all the first reference vectors. Specifically, a value of 1.33 is calculated as a base value by dividing the number "8" that is the number of the learning vectors by the number "6" that is the number of the first reference vectors. Also, the base value is calculated as 2.66 for all the second reference vectors. Specifically, a value of 2.66 is calculated as a base value by dividing the number "8" that is the number of the learning vectors by the number "3" that is the number of the second reference vectors.

A new weighting coefficient may be obtained by multiplying this base value by, for example, a value equal to the weighting coefficient illustrated in FIG. 20. Thus, a greater base value is assigned to a reference vector, among the first reference vector and the second reference vector, having the lowest number of clusters. A lower number of clusters can be said to result in a greater number of learning vectors belonging to each cluster. Since a cluster to which many learning vectors belong can be said to appropriately represent a waveform that is to be input in the normal state, as a result, a greater weight is to be given to one of the first reference vector and the second reference vector that appropriately represents the waveform.

Figure 23:
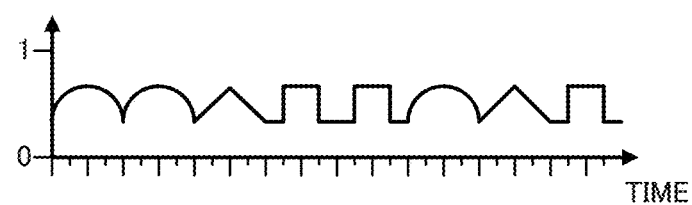
FIG. 23 is a second graph illustrating a learning signal according to the modified example of Embodiment 3.
Figure 24:
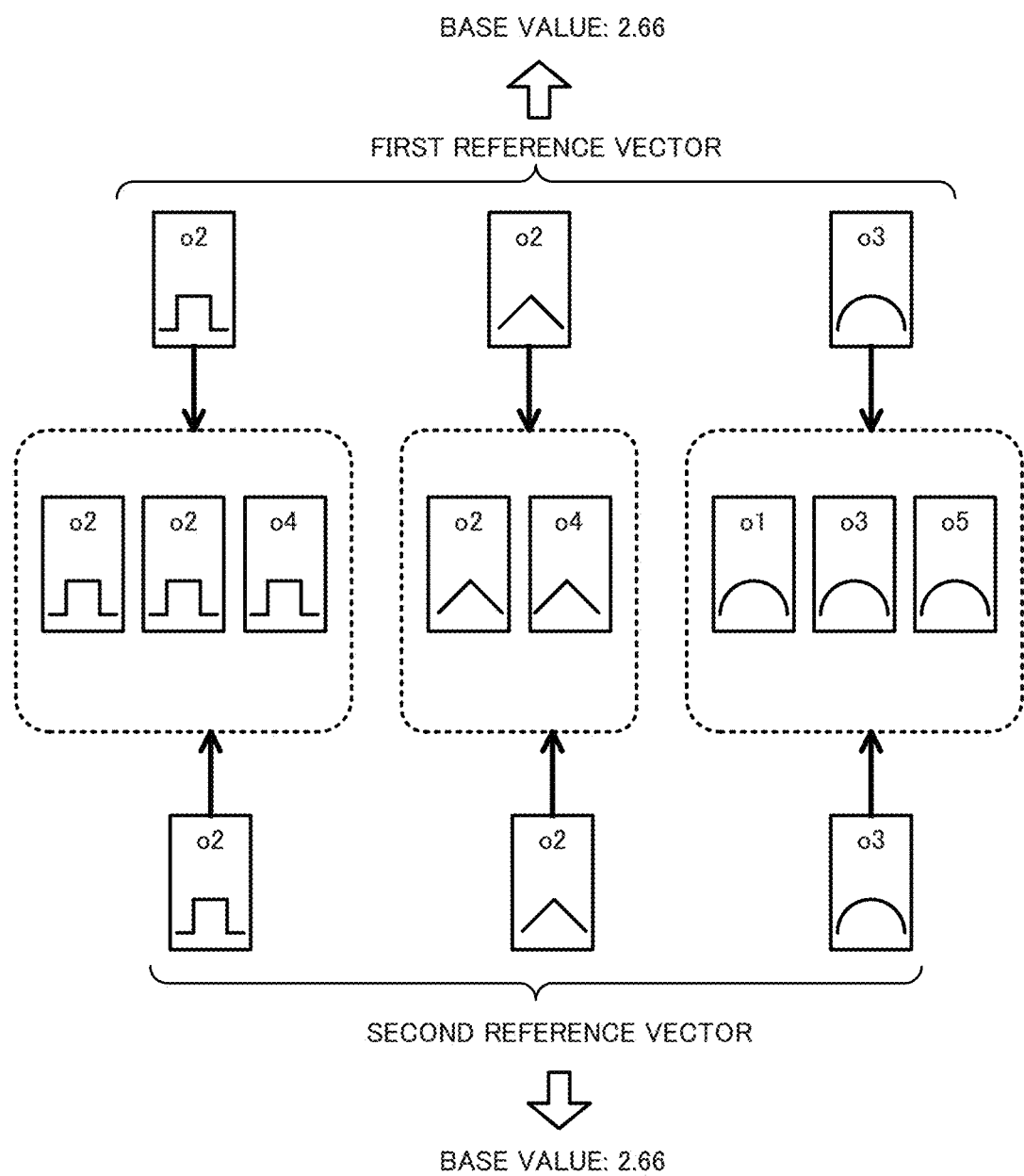
FIG. 24 is a second view for illustrating calculation of a weight according to the modified example of Embodiment 3.

Although the learning signal illustrated in FIG. 23 has waveforms similar to those in FIG. 21, the scale of each waveform is kept unchanged. An example in which the first reference vector and the second reference vector are learned from such a learning signal is schematically illustrated in FIG. 24. As illustrated in FIG. 24, three first reference vectors and three second reference vectors are learned from eight learning vectors. In this example, base values are calculated as 2.66 for both the first reference vectors and the second reference vectors. Accordingly, the third calculator 130 calculates an output value by (i) giving the same weight to the first index value and the second index value and (ii) calculating a weighted sum of the index values.

As illustrated in FIGS. 21 to 24, the diagnosis device 10 may determine the weights in accordance with a trend in the number of learning vectors clustered into clusters corresponding to each reference vector. Also regarding the weights determined in this way, the output value calculated by the third calculator 130 is considered to be capable of being used for accurate abnormality diagnosis.

As described above, although the embodiments of the present disclosure are described, the present disclosure is not limited to the above-described embodiments.

For example, although the example in which the diagnosis system 100 is a part of the production system is described above, the present disclosure is not limited to such a configuration. The diagnosis system 100 may be a part of a processing system as typified by a machining system or an inspection system, or may be an independent system without being included in another system.

Also, although the example in which the acquirer 101 of the diagnosis device 10 acquires the input signal via the network 20 is described above, the present disclosure is not limited to such a configuration. For example, the acquirer 101 may read the input signal from data stored in the auxiliary storage 13 by the user.

Also, in the above-described embodiments, the example in which an output value is calculated from a single input signal is described. However, the present disclosure is not limited to such a configuration. The diagnosis device 10 may acquire multiple input signals and calculate an output value for each of the input signals or may output a single output value obtained by combining the output values calculated for each of the input signals.

In the above-described embodiments, the example in which the output value obtained by combining the first index value and the second index value is calculated is described, and the number of index values combined in order to calculate the output value is two. However, the number of index values is not limited to two and may be three or more. For example, an output value may be calculated by combining, with the first index value and the second index value, a third index value different from both the first index value and the second index value.

In the above-described embodiments, the first index value, the second index value, and the output value are values that become less with an increase in a degree of abnormality. However, the present disclosure is not limited to such configuration, and such values may increase with increase in degree of abnormality.

Also, the functions of the diagnosis device 10 can be achieved by dedicated hardware or a normal computer system.

For example, a device executing the above-described processes can be configured by (i) storing, on a non-transitory computer readable recording medium, the program P1 executed by the processor 11, (ii) distributing the medium, and (iii) installing the program P1 in a computer. A flexible disc, a compact disc-read only memory (CD-ROM), a digital versatile disc (DVD), or a magneto-optical disc (MO) may be considered as an example of such a recording medium.

Also, the program P1 may be previously stored in a disk device included in a server device on a communication network as typified by the Internet and may be downloaded onto a computer, for example, with the program P1 superimposed on a carrier wave.

The above-described processing can also be achieved by starting and executing the program P1 during transmission of the program P1 via the communication network.

Additionally, the above-described processing can be also achieved by executing all of or a portion of the program P1 on the server device and executing the program while the computer is transmitting and receiving information on the processing via the communication network.

When the above-described functions are achieved (i) by sharing tasks with an operating system (OS) or (ii) by cooperation between the OS and an application, only portions of the program P1 other than a portion of the program P1 executed by the OS may be stored in the medium, and the medium may be distributed. Alternatively, such portions of the program P1 may be downloaded to a computer.

Also, the means for achieving the functions of the diagnosis device 10 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure is suitable for diagnosing an abnormality indicated by a signal.

REFERENCE SIGNS LIST

100 Diagnosis system
10 Diagnosis device
11 Processor
12 Main storage
13 Auxiliary storage
14 Inputter
15 Outputter
16 Communicator
17 Internal bus
101 Acquirer
102 Learner
110 First calculator
111 Storage
120 Second calculator
121 Storage
130 Third calculator
140 Diagnoser
1021 Weight calculator
20 Network
21 Device
211 Signal source
23, 24 Waveform
26 Window
27 Memory
301 to 303 Waveform
310, 314 Window
311 Learning vector
315, 315a Trial vector
316 First reference vector
317 Second reference vector
L1, L2 Line
P1 Program

The invention claimed is:

1. A diagnosis device comprising:
processing circuitry configured to
acquire a series of input values from a device having a signal source in a factory via a network as an input signal to be diagnosed as to presence or absence of abnormality;
diagnose a diagnosis of presence or absence of abnormality from
a first index value indicating a distance between an input vector and a predetermined first reference vector, the input vector having components that are the input values of the series acquired, and a second index value indicating an angle between the input vector and a predetermined second reference vector; and output the diagnosis, wherein the processing circuitry is configured to diagnose the presence or absence of abnormality from a weighted sum of the first index value and the second index value, learn the first reference vector and the second reference vector from a learning signal, acquire the learning signal and the input signal, learn the first reference vector and the second reference vector from the learning signal, calculate respective weights of the first and second reference vectors in accordance with results of the learning, and the weighted sum is equal to a sum of values obtained by multiplying the first index value and the second index value by the respective weights calculated, the first index value indicating the distance between the input vector and the first reference vector, the second index value indicating the angle between the input vector and the second reference vector, and wherein the processing circuitry is further configured to cut out, from the learning signal, a plurality of series of learning values, to generate multiple learning vectors that each have, as components, the learning values of a series of the plurality of series, perform clustering in accordance with a distance between the learning vectors, to learn the first reference vector, and perform clustering in accordance with an angle between the learning vectors, to learn the second reference vector.

2. The diagnosis device according to claim 1, wherein the processing circuitry divides the learning signal into a learning partial signal and a trial signal, learns the first reference vector and the second reference vector by the clustering of a learning vectors generated by the learning partial signal, cuts out, from the trial signal, a series of trial values, to generate a trial vector that has, as components, the trial values of the series, calculates a weight of the first reference vector in accordance with a distance between the trial vector and the first reference vector, and calculates a weight of the second reference vector in accordance with an angle between the trial vector and the second reference vector.

3. The diagnosis device according to claim 1, wherein the processing circuitry calculates a weight of the first reference vector in accordance with a number of learning vectors that belong to a cluster corresponding to the first reference vector, and calculates a weight of the second reference vector in accordance with a number of learning vectors that belong to a cluster corresponding to the second reference vector.

4. The diagnosis device according to claim 1, wherein the weighted sum is equal to a sum of values obtained by multiplying each of the first index value and the second index value by a weight corresponding to a difference or a ratio between the first index value and the second index value.

5. The diagnosis device according to claim 1, wherein the processing circuitry performs the clustering according to a Gaussian Mixture Model (GMM).

6. The diagnosis device according to claim 1, wherein a number of clusters in the performing of the clustering is predetermined.

7. The diagnosis device according to claim 1, wherein a number of clusters in the performing of the clustering is determined according to an Akaike information criterion (AIC).

8. The diagnosis device according to claim 1, wherein the first index value is given by $1/(1+D)$, where D is the distance between the input vector and the predetermined first reference vector.

9. The diagnosis device according to claim 1, wherein the second index value is given by $\cos(\theta/2)+(1/2)$, where $\theta$ is the angle between the input vector and the predetermined second reference vector.

10. The diagnosis device according to claim 1, wherein the first index value and the second index value are normalized.

11. The diagnosis device according to claim 1, wherein the distance between the input vector and the predetermined first reference vector is determined as a Manhattan distance.

12. The diagnosis device according to claim 1, wherein the distance between the input vector and the predetermined first reference vector is determined as a distance defined by dynamic time warping (DTW).

13. The diagnosis device according to claim 1, wherein the distance between the input vector and the predetermined first reference vector is a Euclidean distance.

14. A diagnosis method comprising:

acquiring, with processing circuitry, a series of input values from a device having a signal source in a factory via a network;

diagnosing, with the circuitry, a diagnosis of presence or absence of abnormality from a distance between an input vector and a predetermined first reference vector and an angle between the input vector and a predetermined second reference vector, the input vector having, as components, the input values of the acquired series; and outputting the diagnosis, wherein the method further includes diagnosing the presence or absence of abnormality from a weighted sum of the first index value and the second index value, learning the first reference vector and the second reference vector from a learning signal, acquiring the learning signal and the input signal, learning the first reference vector and the second reference vector from the learning signal, calculating respective weights of the first and second reference vectors in accordance with results of the learning, and the weighted sum is equal to a sum of values obtained by multiplying the first index value and the second index value by the respective weights calculated, the first index value indicating the distance between the input vector and the first reference vector, the second index value indicating the angle between the input vector and the second reference vector, and wherein the method further includes cutting out, from the learning signal, a plurality of series of learning values, to generate multiple learning vectors that each have, as components, the learning values of a series of the plurality of series, performing clustering in accordance with a distance between the learning vectors, to learn the first reference vector, and performing clustering in accordance with an angle between the learning vectors, to learn the second reference vector.

15. A non-transitory computer-readable recording medium storing program that, when executed by processing circuitry, causes the processing circuitry to perform a method comprising:

acquiring a series of input values from a device having a signal source in a factory via a network;

diagnosing a diagnosis of presence or absence of abnormality from a distance between an input vector and a predetermined first reference vector and an angle between the input vector and a predetermined second reference vector, the input vector having, as components, the input values of the acquired series; and outputting the diagnosis, wherein the method further includes diagnosing the presence or absence of abnormality from a weighted sum of the first index value and the second index value, learning the first reference vector and the second reference vector from a learning signal, acquiring the learning signal and the input signal, learning the first reference vector and the second reference vector from the learning signal, calculating respective weights of the first and second reference vectors in accordance with results of the learning, and the weighted sum is equal to a sum of values obtained by multiplying the first index value and the second index value by the respective weights calculated, the first index value indicating the distance between the input vector and the first reference vector, the second index value indicating the angle between the input vector and the second reference vector, and wherein the method further includes cutting out, from the learning signal, a plurality of series of learning values, to generate multiple learning vectors that each have, as components, the learning values of a series of the plurality of series, performing clustering in accordance with a distance between the learning vectors, to learn the first reference vector, and performing clustering in accordance with an angle between the learning vectors, to learn the second reference vector.

* * * * *